(12) United States Patent
Gieseke et al.

(10) Patent No.: US 6,852,148 B2
(45) Date of Patent: Feb. 8, 2005

(54) AEROSOL SEPARATOR AND METHOD

(75) Inventors: Steven S. Gieseke, Richfield, MN (US); Robert A Dushek, Richfield, MN (US); Carolyn J. Finnerty, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 42 days.

(21) Appl. No.: 10/168,906

(22) PCT Filed: Dec. 28, 2000

(86) PCT No.: PCT/US00/35523

§ 371 (c)(1),
(2), (4) Date: Sep. 16, 2002

(87) PCT Pub. No.: WO01/47618

PCT Pub. Date: Jul. 5, 2001

(65) Prior Publication Data

US 2003/0051455 A1 Mar. 20, 2003

Related U.S. Application Data

(63) Continuation-in-part of application No. 09/474,616, filed on Dec. 29, 1999, now Pat. No. 6,290,739.

(51) Int. Cl.[7] ................... B01D 46/02; B01D 46/10

(52) U.S. Cl. ................... 95/287; 55/385.3; 55/466; 55/482; 55/486; 55/498; 55/499; 55/501; 55/502; 55/503; 55/510; 55/DIG. 25; 55/DIG. 30

(58) Field of Search .................. 55/350.1, 385.3, 55/466, 486, 482, 495, 497, 498, 499, 501, 502, 503, 521, DIG. 17, DIG. 19, DIG. 25, DIG. 30, 510; 95/273, 287

(56) References Cited

U.S. PATENT DOCUMENTS

| | | | |
|---|---|---|---|
| 991,572 | A | 5/1911 | Weisenstein |
| 1,838,751 | A | 12/1931 | Earnest |
| 1,856,527 | A | 5/1932 | Winslow |
| 2,060,883 | A | 11/1936 | Lowther |
| 2,080,988 | A | 5/1937 | Schulz |
| 2,120,050 | A | 6/1938 | Lowther |
| 2,178,033 | A | 10/1939 | Decker |
| 2,250,200 | A | 7/1941 | Lowther |

(List continued on next page.)

FOREIGN PATENT DOCUMENTS

| | | |
|---|---|---|
| DE | 196 08 589 | 9/1997 |
| DE | 196 08 589 A1 | 9/1997 |
| DE | 196 19 770 A1 | 11/1997 |
| DE | 297 14 886 U1 | 11/1997 |
| EP | 0 576 783 A1 | 1/1994 |
| EP | 0 611 876 A1 | 8/1994 |
| GB | 613386 | 11/1948 |
| GB | 661649 | 11/1951 |
| GB | 1 392 936 | 5/1975 |
| GB | 1392936 | 5/1975 |
| GB | 1 566 220 | 4/1980 |
| GB | 2 106 634 A | 4/1983 |
| RU | 1711661 A3 | 2/1992 |
| WO | WO 01/47618 | 7/2001 |

*Primary Examiner*—Duane Smith
*Assistant Examiner*—Jason M. Greene
(74) *Attorney, Agent, or Firm*—Merchant & Gould PC

(57) ABSTRACT

An arrangement for separating a hydrophobic liquid phase from a gaseous stream includes a coalescer filter, a housing, a gas flow direction arrangement, and a liquid collection arrangement. The coalescer filter includes a non-woven media of fibers. The housing includes an interior having a gas flow inlet and a gas flow outlet. The liquid collection arrangement is positioned within the housing construction and is oriented for receiving liquid collected from the coalescer filter and drained therefrom.

20 Claims, 22 Drawing Sheets

U.S. PATENT DOCUMENTS

| | | |
|---|---|---|
| 2,252,974 A | 8/1941 | Lowther |
| RE21,965 E | 12/1941 | Lowther |
| 2,273,210 A | 2/1942 | Lowther et al. |
| 2,359,485 A | 10/1944 | Lowther |
| D148,396 S | 1/1948 | Stevens et al. |
| 2,539,378 A | 1/1951 | Stootman |
| 2,547,587 A | 4/1951 | Lowther |
| 3,115,873 A | 12/1963 | Hahn et al. |
| 3,167,416 A | 1/1965 | Humbert, Jr. et al. |
| 3,263,402 A | 8/1966 | Lindamood et al. |
| 3,266,229 A | 8/1966 | Witkowski |
| 3,450,117 A | 6/1969 | McHattie et al. |
| 3,509,967 A | 5/1970 | Ballard |
| 3,589,108 A | 6/1971 | Dingel et al. |
| 3,721,069 A | 3/1973 | Walker |
| 3,754,538 A | 8/1973 | Ephraim, Jr. et al. |
| 3,789,582 A | 2/1974 | Graybill |
| 3,793,813 A | 2/1974 | McAllister |
| 3,796,025 A | 3/1974 | Kasten |
| 3,822,532 A | 7/1974 | Weisgerber |
| 4,018,580 A | 4/1977 | Burkholz et al. |
| 4,047,912 A | 9/1977 | Markland |
| 4,095,966 A | 6/1978 | Isley |
| 4,111,815 A | 9/1978 | Walker et al. |
| 4,184,858 A | 1/1980 | Walker |
| 4,203,739 A * | 5/1980 | Erdmannsdorfer ........... 55/482 |
| 4,233,042 A | 11/1980 | Tao |
| 4,236,901 A | 12/1980 | Kato et al. |
| 4,256,474 A * | 3/1981 | Berger et al. ................. 55/482 |
| 4,269,607 A | 5/1981 | Walker |
| 4,373,499 A | 2/1983 | Bendig |
| 4,378,983 A | 4/1983 | Martin |
| 4,396,407 A | 8/1983 | Reese |
| 4,401,093 A | 8/1983 | Gates, Jr. et al. |
| 4,404,950 A | 9/1983 | Dallman |
| 4,409,950 A | 10/1983 | Goldberg |
| 4,425,145 A | 1/1984 | Reese |
| 4,445,912 A | 5/1984 | Volk et al. |
| 4,585,466 A | 4/1986 | Syred et al. |
| 4,602,595 A | 7/1986 | Aoki et al. |
| 4,627,406 A | 12/1986 | Namiki et al. |
| 4,632,682 A | 12/1986 | Erdmannsdorfer |
| 4,653,457 A | 3/1987 | Stege |
| 4,692,175 A | 9/1987 | Frantz |
| 4,704,143 A | 11/1987 | Percy |
| 4,724,807 A | 2/1988 | Walker |
| 4,759,782 A | 7/1988 | Miller et al. |
| D298,051 S | 10/1988 | Matheson et al. |
| 4,848,989 A * | 7/1989 | Maeda ........................ 55/482 |
| 4,861,359 A | 8/1989 | Tettman |
| 4,872,890 A | 10/1989 | Lamprecht et al. |
| 4,878,929 A | 11/1989 | Tofsland et al. |
| 4,925,469 A | 5/1990 | Clement et al. |
| 4,995,891 A | 2/1991 | Jaynes |
| 5,019,141 A | 5/1991 | Granville et al. |
| 5,035,729 A | 7/1991 | Hodgkins |
| 5,039,323 A | 8/1991 | Ulitsky et al. |
| 5,046,474 A | 9/1991 | Percy |
| 5,053,126 A | 10/1991 | Krasnoff |
| 5,080,082 A | 1/1992 | Mueller et al. |
| 5,090,393 A | 2/1992 | Holch |
| 5,125,941 A | 6/1992 | Ernst et al. |
| 5,140,957 A | 8/1992 | Walker |
| 5,277,157 A | 1/1994 | Teich |
| 5,284,997 A | 2/1994 | Spearman et al. |
| 5,347,973 A | 9/1994 | Walker, Jr. |
| 5,417,848 A | 5/1995 | Erdmannsdorfer et al. |
| 5,429,101 A | 7/1995 | Uebelhoer et al. |
| 5,438,965 A | 8/1995 | Aronsson et al. |
| 5,450,835 A | 9/1995 | Wagner |
| 5,454,945 A | 10/1995 | Spearman |
| 5,460,147 A | 10/1995 | Bohl |
| 5,471,966 A | 12/1995 | Feuling |
| 5,472,463 A | 12/1995 | Herman et al. |
| 5,479,907 A | 1/1996 | Walker, Jr. |
| 5,494,020 A | 2/1996 | Meng |
| 5,494,497 A | 2/1996 | Lee |
| D368,266 S | 3/1996 | McClain et al. |
| 5,497,755 A | 3/1996 | Maloney |
| 5,509,948 A | 4/1996 | Keller et al. |
| 5,564,401 A | 10/1996 | Dickson |
| 5,579,744 A | 12/1996 | Trefz |
| 5,586,996 A | 12/1996 | Manookian, Jr. |
| RE35,433 E | 1/1997 | Alexander, III |
| 5,591,338 A | 1/1997 | Pruette et al. |
| 5,602,373 A | 2/1997 | Sauer et al. |
| 5,605,555 A | 2/1997 | Patel et al. |
| 5,609,658 A | 3/1997 | Takemura et al. |
| 5,633,341 A | 5/1997 | Abend |
| 5,640,937 A | 6/1997 | Slopsema |
| 5,660,607 A | 8/1997 | Jokschas et al. |
| 5,681,462 A | 10/1997 | Brockhoff et al. |
| 5,690,709 A | 11/1997 | Barnes |
| 5,707,521 A | 1/1998 | Erdmannsdoerfer et al. |
| 5,713,985 A | 2/1998 | Hamilton |
| 5,750,024 A | 5/1998 | Spearman |
| 5,752,999 A | 5/1998 | Newby et al. |
| 5,759,217 A | 6/1998 | Joy |
| 5,795,369 A | 8/1998 | Taub |
| 5,800,587 A | 9/1998 | Kahlbaugh et al. |
| 5,846,271 A * | 12/1998 | Flynn et al. ................... 55/482 |
| 5,853,439 A * | 12/1998 | Gieseke et al. ............ 55/350.1 |
| 5,865,863 A | 2/1999 | DeSousa et al. |
| D410,010 S | 5/1999 | Gieseke et al. |
| 5,902,361 A | 5/1999 | Pomplun et al. |
| 5,921,214 A | 7/1999 | Fujita et al. |
| D420,117 S | 2/2000 | Gieseke et al. |
| 6,143,049 A | 11/2000 | Gieseke |
| 6,171,355 B1 | 1/2001 | Gieseke et al. |
| 6,187,073 B1 | 2/2001 | Gieseke et al. |
| D439,962 S | 4/2001 | Gieseke et al. |
| D439,963 S | 4/2001 | Gieseke et al. |
| D440,293 S | 4/2001 | Gieseke et al. |
| 6,290,739 B1 * | 9/2001 | Gieseke et al. ............... 55/482 |
| 6,309,436 B1 * | 10/2001 | Holch ........................ 55/482 |
| 6,355,076 B2 | 3/2002 | Gieseke et al. |
| 6,530,969 B2 * | 3/2003 | Gieseke et al. ............... 55/482 |
| 6,540,801 B2 | 4/2003 | Gieseke et al. |
| 6,758,873 B2 | 7/2004 | Gieseke et al. |
| 2001/0003893 A1 * | 6/2001 | Ramos et al. ................. 55/482 |
| 2003/0217534 A1 * | 11/2003 | Krisko et al. ................. 55/482 |

* cited by examiner

US 6,852,148 B2

1

AEROSOL SEPARATOR AND METHOD

This application is a continuation-in-part of Ser. No. 09/474,616 filed Dec. 29, 1999 now U.S. Pat. No. 6,290,739.

TECHNICAL FIELD

This disclosure relates to systems and methods for separating hydrophobic fluids (such as oils) which are entrained as aerosols, from gas streams (for example, air streams). Preferred arrangements also provide for filtration of other fine contaminants, for example carbon material, from the gas streams. Methods for conducting the separations are also provided.

BACKGROUND

Certain gas streams, such as blow-by gases from the crankcase of diesel engines, carry substantial amounts of entrained oils therein, as aerosol. The majority of the oil droplets within the aerosol are generally within the size of 0.1–5.0 microns.

In addition, such gas streams also carry substantial amounts of fine contaminant, such as carbon contaminants. Such contaminants generally have an average particle size of about 0.5–3.0 microns.

In some systems, it is desirable to vent such gases to the atmosphere. In general, it is preferred that before the gases are vented to the atmosphere, they be cleaned of a substantial portion of the aerosol and/or organic particulate contaminants therein.

In other instances, it is desirable to direct the air or gas stream into equipment. When such is the case, it may be desirable to separate aerosol and/or particulates from the stream during the circulation, in order to provide such benefits as: reduced negative effects on the downstream equipment; improved efficiency; recapture of otherwise lost oils; and/or to address environmental concerns.

A variety of efforts have been directed to the above types of concerns. The variables toward which improvements are desired generally concern the following: (a) size/efficiency concerns; that is, a desire for good efficiency of separation while at the same time avoidance of a requirement for a large separator system; (b) cost/efficiency; that is, a desire for good or high efficiency without the requirement of substantially expensive systems; (c) versatility; that is, development of systems that can be adapted for a wide variety of applications and uses, without significant re-engineering; and, (d) cleanability/regeneratability; that is, development of systems which can be readily cleaned (or regenerated) if such becomes desired, after prolonged use.

SUMMARY OF THE DISCLOSURE

A filter arrangement is provided that includes a first stage coalescer filter and a second stage filter element downstream from the coalescer filter. Preferably, the first stage coalescer filter comprises a non-woven fibrous media. The second stage filter element will preferably include pleated media. Preferred constructions will include a filter arrangement including a tubular extension of pleated media defining an open filter interior; a first end cap at one end of the tubular extension of pleated media; the first end cap having an aperture in communication with the open filter interior; a second end cap at an end of the tubular extension of media opposite of the first end cap; and the fibrous media oriented in flow communication with the open filter interior.

In preferred embodiments, a flow construction arrangement is oriented within the open filter interior oriented to direct fluid from the region of pleated media.

2

Preferably, a preformed insert comprising a frame construction holds the fibrous media, and is secured to the first end cap.

A gas cleaner is described that includes a housing construction with filter arrangements, constructed according to principles herein, operably installed and removably replaceable within the housing construction.

In preferred applications, filter arrangements as described herein are usable to clean blowby gases from the crankcase of an engine. Systems, methods of use, and servicing are described herein.

DETAILED DESCRIPTION

I. A Typical Application—Engine Crankcase Breather Filter

Pressure-charged diesel engines often generate "blow-by" gases, i.e., a flow of air-fuel mixture leaking past pistons from the combustion chambers. Such "blow-by gases" generally comprise a gas phase, for example air or combustion off gases, carrying therein: (a) hydrophobic fluid (e.g., oil including fuel aerosol) principally comprising 0.1–5.0 micron droplets (principally, by number); and, (b) carbon contaminant from combustion, typically comprising carbon particles, a majority of which are about 0.1–10 microns in size. Such "blow-by gases" are generally directed outwardly from the engine block, through a blow-by vent.

Herein when the term "hydrophobic" fluids is used in reference to the entrained liquid aerosol in gas flow, reference is meant to nonaqueous fluids, especially oils. Generally such materials are immiscible in water. Herein the term "gas" or variants thereof, used in connection with the carrier fluid, refers to air, combustion off gases, and other carrier gases for the aerosol.

The gases may carry substantial amounts of other components. Such components may include, for example, copper, lead, silicone, aluminum, iron, chromium, sodium, molybdenum, tin, and other heavy metals.

Engines operating in such systems as trucks, farm machinery, boats, buses, and other systems generally comprising diesel engines, may have significant gas flows contaminated as described above. For example, flow rates and volumes on the order of 2–50 cubic feet per minute (cfm), typically 5 to 10 cfm, are fairly common.

Figure 1:
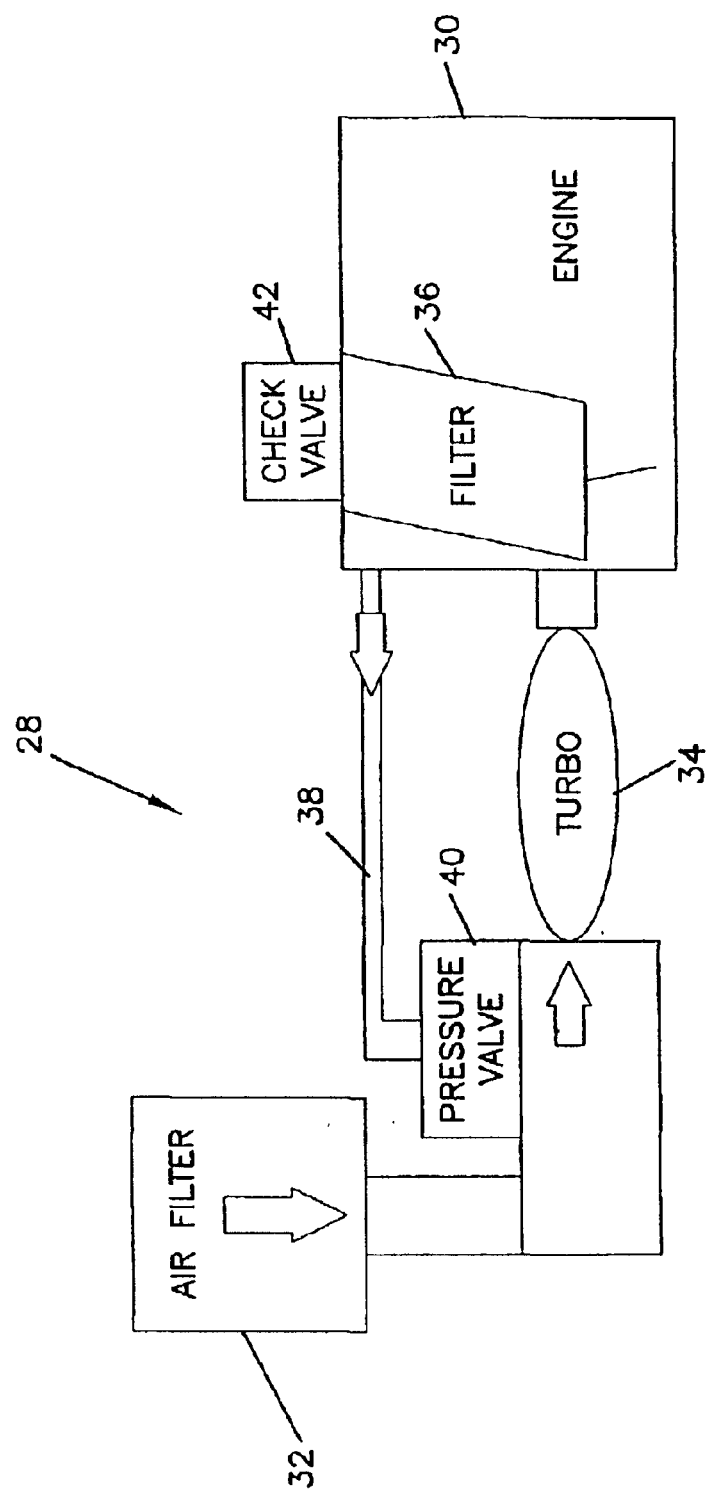
FIG. 1 is a schematic view of an engine system using a filter arrangement constructed according to principles of this disclosure.

FIG. 1 illustrates a schematic indicating a typical system 28 in which a coalescer/separator arrangement according to the present invention would be utilized. Referring to FIG. 1, block 30 represents a turbocharged diesel engine. Air is taken to the engine 30 through an air filter 32. Air filter or cleaner 32 cleans the air taken in from the atmosphere. A turbo 34 draws the clean air from the air filter 32 and pushes it into engine 30. While in engine 30, the air undergoes compression and combustion by engaging with pistons and fuel. During the combustion process, the engine 30 gives off blow-by gases. A filter arrangement 36 is in gas flow communication with engine 30 and cleans the blow-by gases. From filter arrangement 36, the air is directed through channel 38 and through a pressure valve 40. From there, the air is again pulled through by the turbo 34 and into the engine 30. Regulator valve or pressure valve 40 regulates the amount of pressure in the engine crankcase 30. Pressure valve 40 opens more and more, as the pressure in the engine crankcase increases, in order to try to decrease the pressure to an optimal level. The pressure valve 40 closes to a smaller amount when it is desirable to increase the pressure within the engine. A check valve 42 is provided, such that when the pressure exceeds a certain amount in the engine crankcase 30, the check valve 42 opens to the atmosphere, to prevent engine damage.

According to this disclosure, the filter arrangement 36 for separating a hydrophobic liquid phase from a gaseous stream (sometimes referred to herein as a coalescer/separator arrangement) is provided. In operation, a contaminated gas flow is directed into the coalescer/separator arrangement 36. Within the arrangement 36, the fine oil phase or aerosol phase (i.e., hydrophobic phase) coalesces. The arrangement 36 is constructed so that as the hydrophobic phase coalesces into droplets, it will drain as a liquid such that it can readily be collected and removed from the system. With preferred arrangements as described hereinbelow, the coalescer or coalescer/separator, especially with the oil phase in part loaded thereon, operates as a prefilter for carbon contaminant carried in the gas stream. Indeed, in preferred systems, as the oil is drained from the system, it will provide some self-cleaning of the coalescer because the oil will carry therein a portion of the trapped carbon contaminant.

II. Multi-Stage Oil Aerosol Separator Embodiment, FIGS. 2–9

Figure 2:
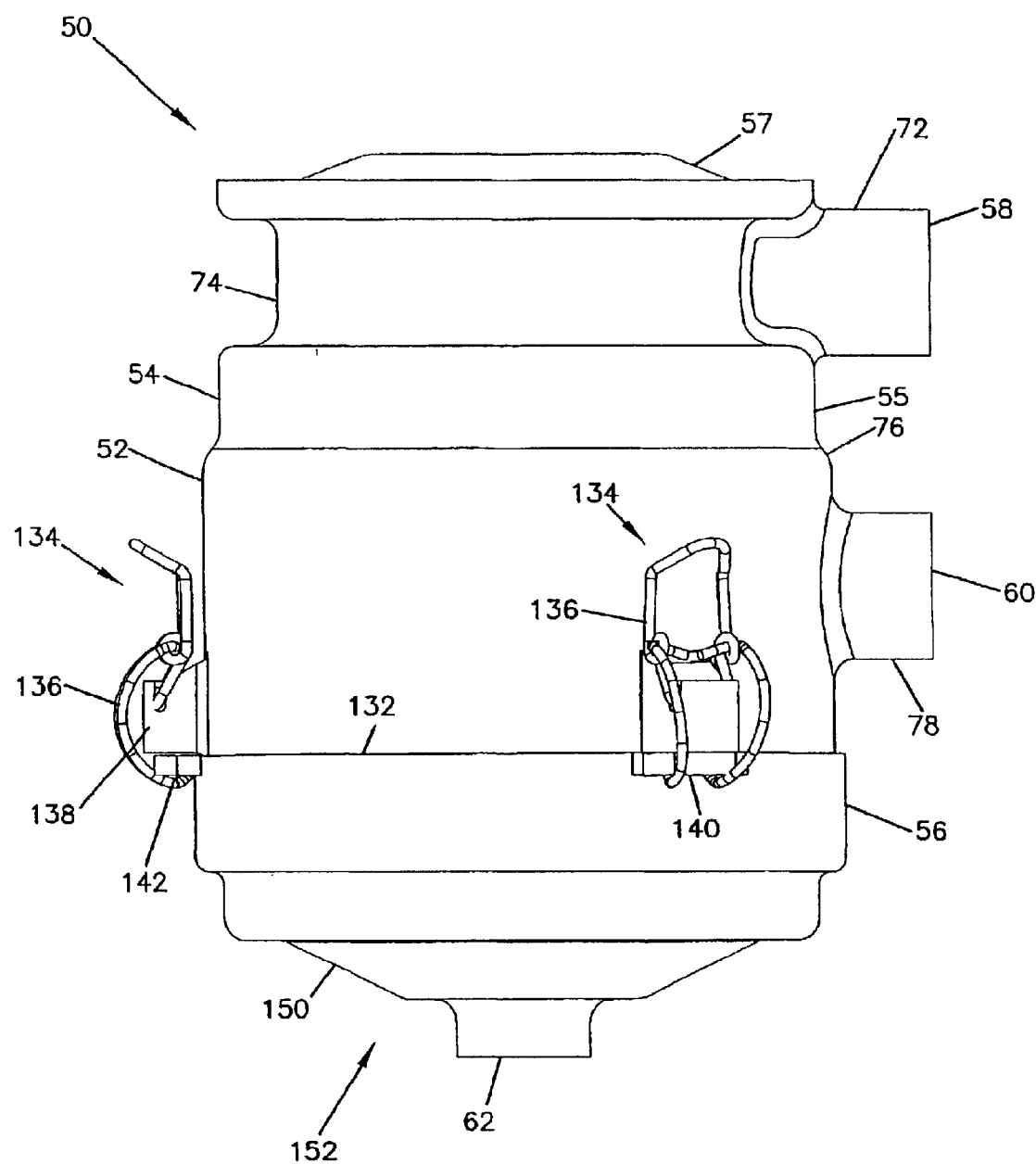
FIG. 2 is a side elevational view of one embodiment of a filter arrangement, constructed according to principles of this disclosure.
Figure 3:
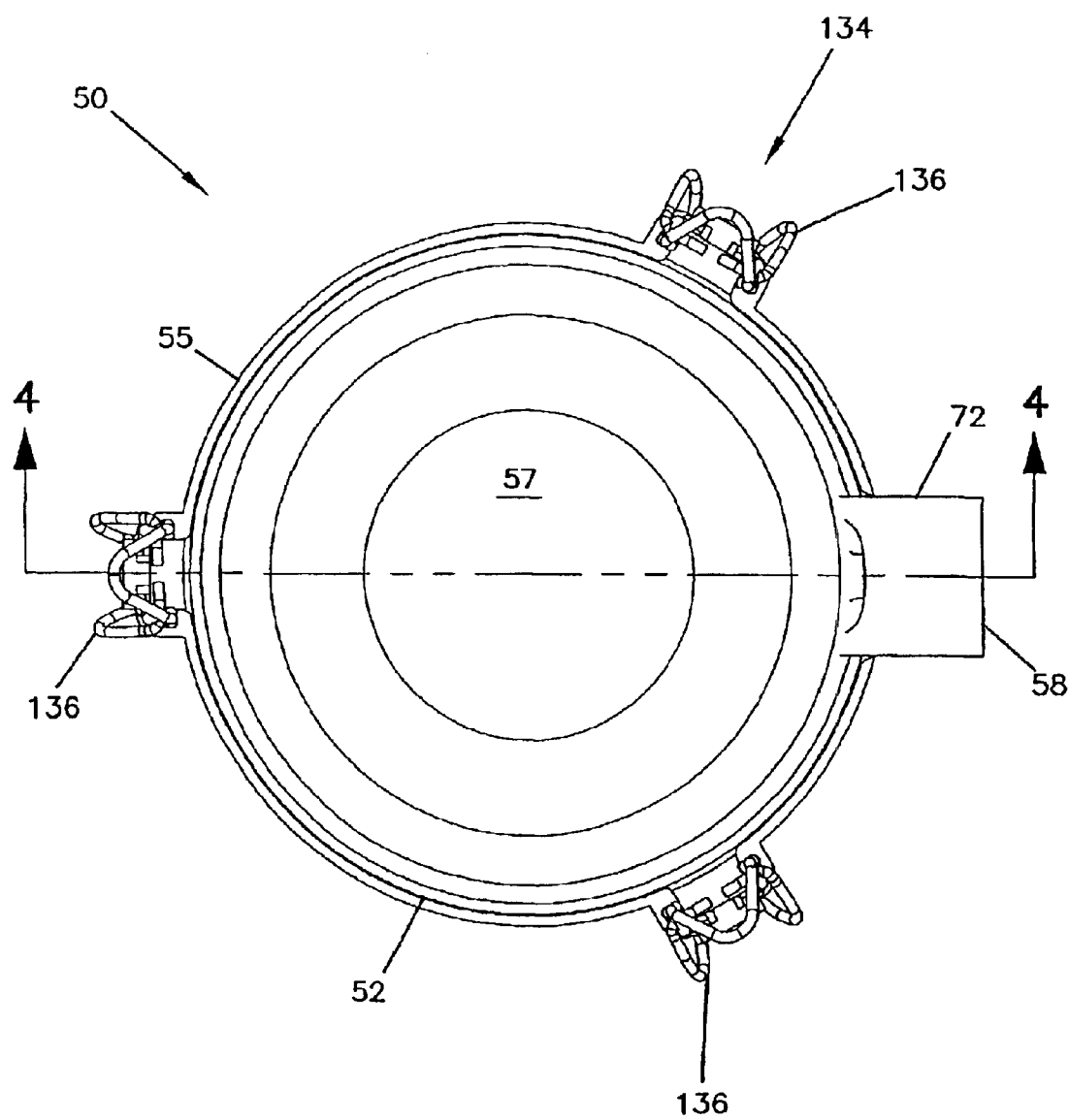
FIG. 3 is an end view of the filter arrangement depicted in FIG. 2.

Referring to FIG. 2, an embodiment of a crankcase gas filter or filter arrangement 36 is depicted at reference numeral 50. The preferred filter arrangement 50 depicted includes a housing 52. The preferred depicted housing 52 has a two-piece construction. More specifically, housing 52 comprises a body assembly 54 and a removable cover member 56. The body assembly 54 includes body 55 and lid 57.

Figure 4:
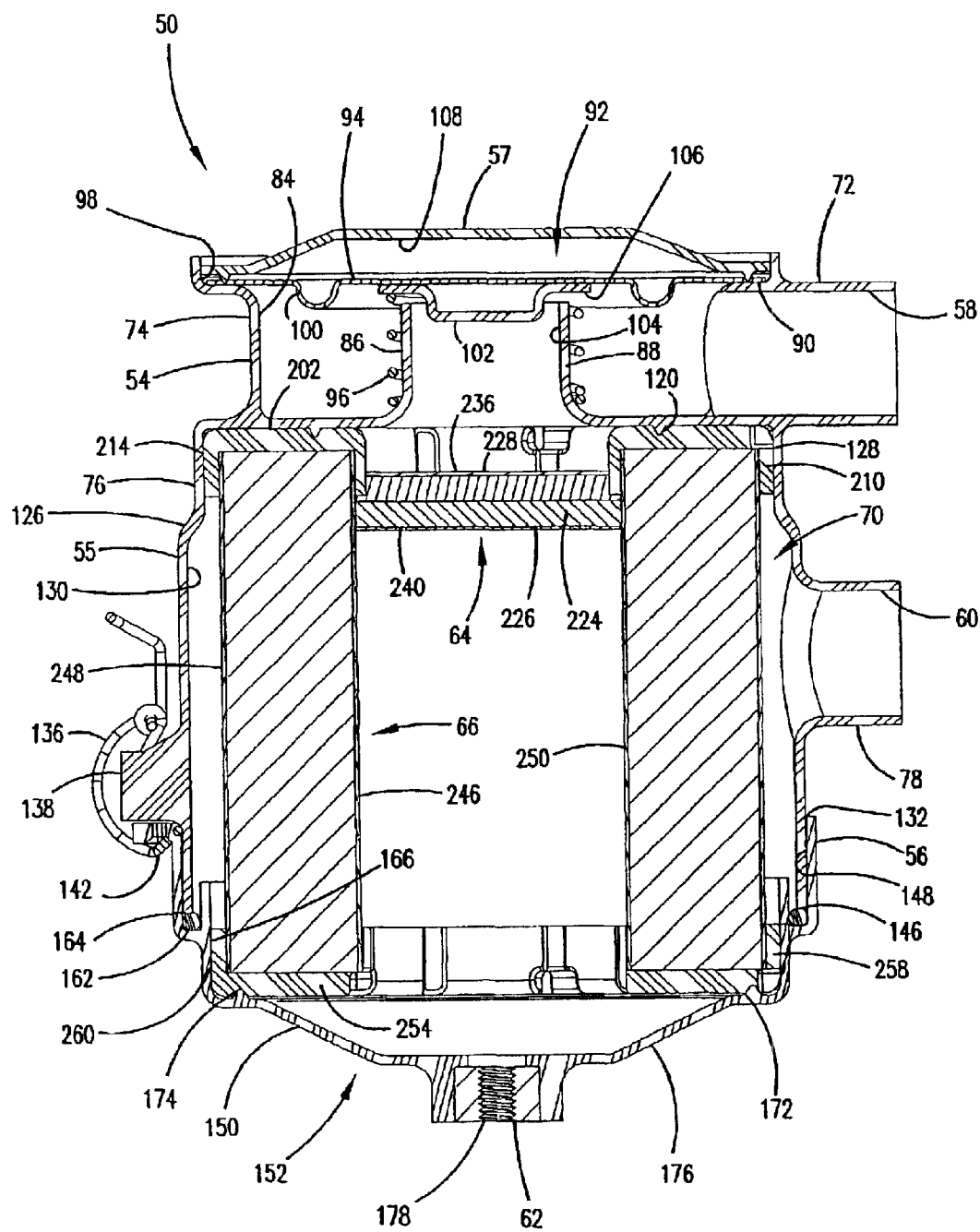
FIG. 4 is a cross-sectional view of the filter arrangement depicted in FIGS. 2 and 3, and taken along the line 4—4 of FIG. 3.

Referring to FIGS. 2 and 4, the preferred housing 52 depicted includes the following 3 ports: gas flow inlet port 58; gas flow outlet port 60; and liquid flow outlet port or liquid drain 62.

In general, the filter arrangement 50 may be generally referenced herein as a "multi-stage" arrangement because it includes both: (a) a coalescer filter, to remove a liquid phase from a liquid entrained gas stream; and, (b) at least a single but could include multiple, downstream or second stage filters, for further purification of the air stream. In FIG. 4, a cross-sectional view of the filter arrangement 50 including both the housing 52 and its internal components is depicted. In general, the filter arrangement 50 includes a first stage coalescer filter 64, and a second stage tubular construction of filter media 66.

In use, an air or gas stream to be modified is directed through the inlet port 58, and through the first stage coalescer filter 64. At least a portion of the liquid phase is coalesced and removed from the gaseous stream by the first stage coalescer filter 64. The liquid that is coalesced within the first stage coalescer filter 64 drains by gravity, and in the particular embodiment shown exits the housing 52 through the liquid flow outlet port 62. The gas phase is directed through the second stage media construction 66. The media construction 66 removes at least a portion of particulates from the gas stream, and the cleaned gas stream is then directed outwardly from the housing 52 through the gas flow outlet 60.

Figure 5:
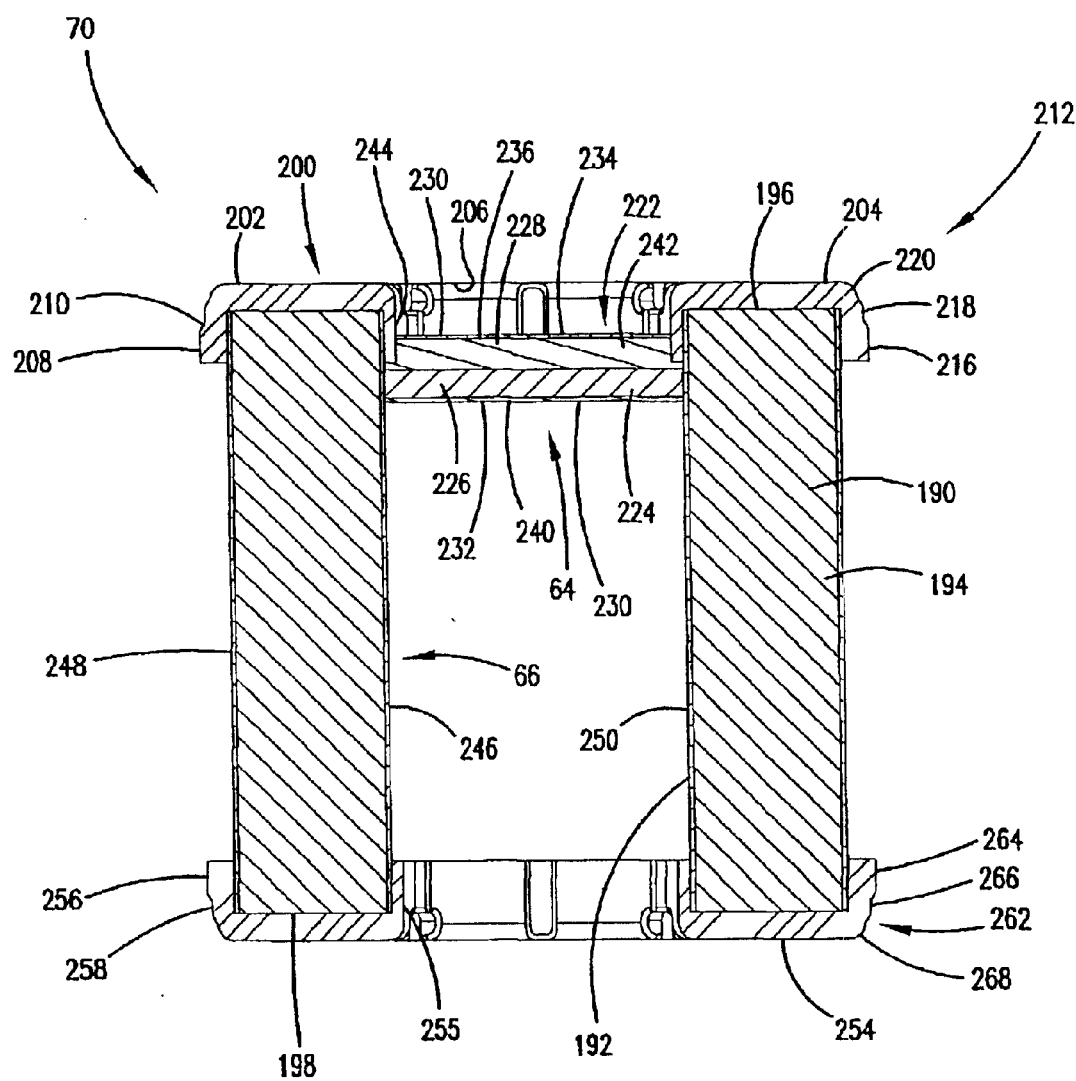
FIG. 5 is a cross-sectional view of one embodiment of a filter element utilized in the filter arrangement of FIGS. 2–4; the cross-section being the same cross-section taken along the line 4—4, but depicting the filter element removed from the housing construction.

As can be seen in FIG. 5, preferably the first stage coalescer filter 64 and second stage tubular construction of media 66 are a single, unitary construction forming a filter arrangement or element 70. In the preferred embodiment illustrated, the filter element 70 is removable and replaceable from the housing 52. By "unitary" in this context it is meant that the first stage coalescer filter 64 and the second stage tubular construction of media 66 cannot be separated from one another without destroying a portion of the assembled element 70. In preferred embodiments, end caps 202, 254 form part of the unitary construction.

In reference again to FIG. 4, for the housing 52 depicted, there is an inlet tube construction 72, a regulator valve housing 74, a canister portion 76, and a outlet tube construction 78. In the embodiment shown, each of the inlet tube construction 72, regulator valve housing 74, canister portion 76, and outlet tube construction 78 form a portion of the body 55. Together with the lid 57, the body 55 and lid 57 are part of the body assembly 54.

In the one shown, the inlet tube construction 72 is a cylindrical member 80 that defines the gas flow inlet port 58. In preferred assemblies, the inlet tube construction 78 is in gas flow communication with the crankcase of engine 30, in order to treat blow-by gases emitted from the crankcase.

The regulator valve housing 74 depicted is immediately downstream of the inlet tube construction 72. The regulator valve housing 74 includes an outer surrounding wall 82 defining an open interior 84, where the gas to be treated is allowed to flow and collect before passing into the filter element 70. The regulator valve housing 74 also includes an internal wall 86 forming a neck 88. In the one illustrated, the regulator valve housing 74 also includes a shelf 90 for holding and supporting the lid 57 thereon. The neck 88 holds and supports a regulator valve assembly 92 (FIG. 4) between the canister portion 76 and the lid 57.

In reference to FIG. 4, the valve assembly 92 is constructed and arranged to regulate the gas flow from the crankcase of the engine 30 and through the filter element 70. While a variety of valve constructions are contemplated herein, the particular valve assembly 92 depicted includes diaphragm construction 94 and a biasing mechanism, such as spring 96. In FIG. 4, note that the diaphragm construction 94 is generally circular with an outermost rim 98 that is held by and rests upon shelf 90. The diaphragm construction 94 also includes a groove 100 having a generally U-shaped cross-section and being generally circular, in plan view. The groove 100 is inboard of the rim 98. The groove 100 helps to keep the diaphragm construction 94 properly oriented and centered upon the neck 88. Secured to the diaphragm construction 94 is a centering projection 102. The centering projection 102 is sized to extend into the interior portion 104 of the neck 88. In the one shown, the centering projection 102 is secured to the diaphragm construction 94 in a region inboard of the groove 100. The centering projection 102, together with the groove 100, helps to keep the diaphragm construction 94 properly oriented over the neck 88.

Still in reference to FIG. 4, in the particular valve assembly 92 shown, the spring 96 rests around the outside wall 86 of the neck 88. The spring 96 applies a force to the diaphragm construction 94 to pull the diaphragm construction 94 in a direction toward the neck 88 and toward the filter element 70. Note that there is a gap 106 between the diaphragm construction 94 and the neck 88. The gap 106 allows for gas flow from the interior 84 of the regulator valve housing 74 and into the interior portion 104 of the neck 88.

In operation, the valve assembly 92 generally operates to limit the rate of gas flow from the engine crankcase 30 to the filter element 70. The spring 96 pulls the diaphragm construction 94 toward the neck 88 against the pressure exerted by the gas flow inwardly from the gas flow inlet 58. The diaphragm construction 94 is constructed of a flexible material, such as rubber. As such, a diaphragm construction 94 is allowed to flex in a direction away from the neck 88 and toward the lid 57 in the volume 108 defined between the lid 57 and the shelf 90 of the regulator valve housing 74.

Figure 6:
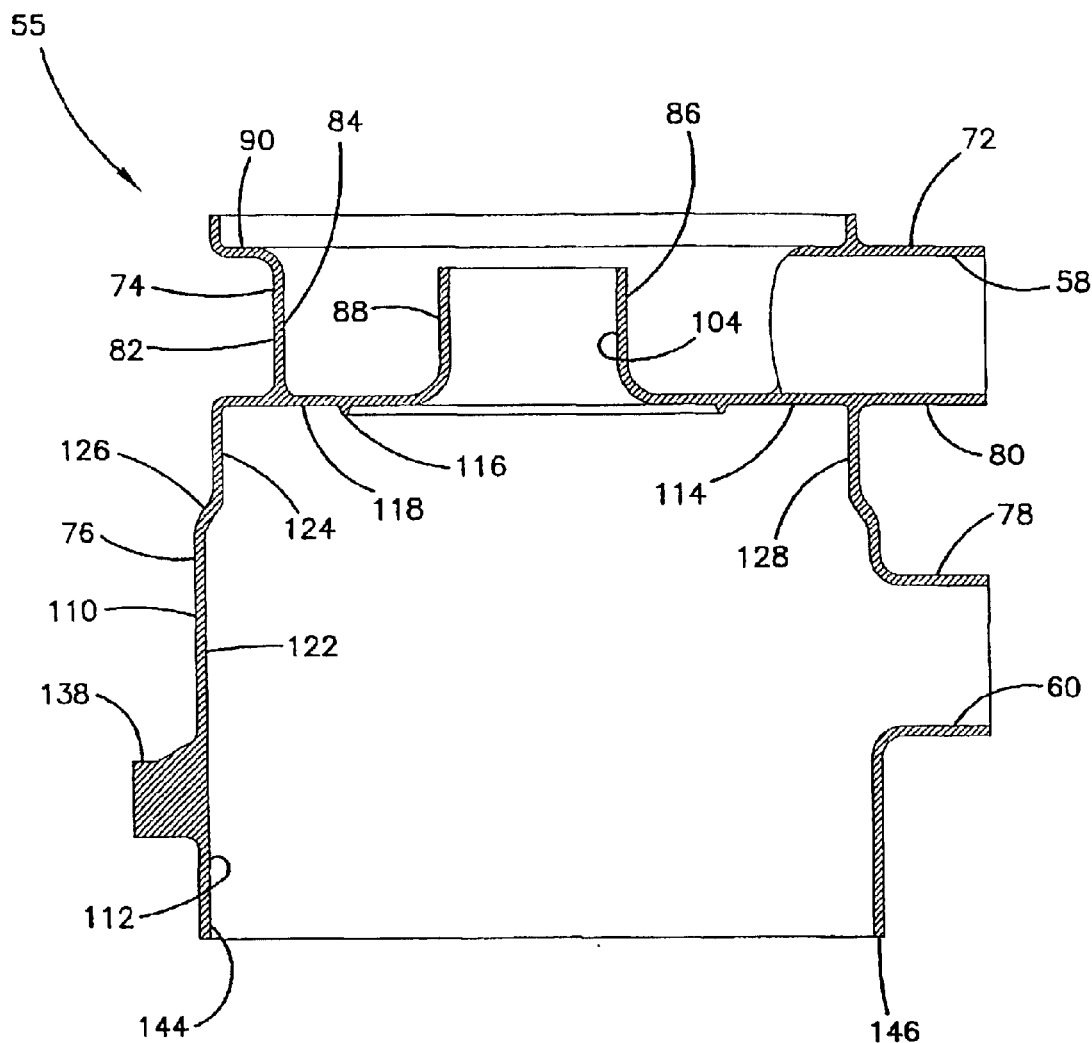
FIG. 6 is a cross-sectional view of one embodiment of the housing construction body; the cross-section being analogous to the cross-section taken along the line 4—4, but depicting only the housing construction body and with a lid removed.

In reference now to FIG. 6, the canister portion 76 of the body 55 includes an outer surrounding wall 110, that is generally tubular in construction to define an open interior 112 for receipt of the filter element 70. In the one depicted, the wall 110 generally is cylindrical to define a circular cross-section. The canister 76 includes an end wall 114 that helps to hold and contain the filter element 70 inside of the canister 76. The end wall 114 includes a projection 116 extending from a flat, planar portion 118. When the filter element 70 is operably assembled within the housing 52, the projection 116 will act as a secondary, or supplemental sealing mechanism to create a secondary seal 120 (FIG. 4) between the end wall 114 of the body 55 and the element 70. It should be appreciated that the primary sealing function is in a radial sealing system between the filter element 70 and the housing 52, which is described in further detail below. The secondary seal 120 helps to prevent unintended amounts of oil seepage from passing along the end wall 114 between the filter element 70 and the housing 52.

Still in reference to FIG. 6, note that the body 55 includes a first tubular region 122 having a first greatest outer dimension and a second tubular region 124 having a second greatest outer dimension. In the particular example illustrated, the greatest outer dimensions of the tubular region 122 and tubular region 124 are diameters. The diameter of the tubular region 122 is greater than the diameter of the tubular region 124, to create a stepped region 126 therebetween. The tubular region 124 defines an inner, annular sealing surface 128. As will be described further below, the sealing surface creates a surface of which it can accept pressure of a seal member to create a radial seal therebetween. The tubular region 122 is spaced from the filter element 70, when the filter element 70 is operably assembled therein, to create a gas flow volume 130 therebetween.

As can be seen in FIG. 2, the body assembly 54 and the cover member 56 are joined to one another along a seam 132 by a latch arrangement 134. The latch arrangement 134 includes a plurality of latches 136 that are used to securely hold the cover member 56 and body assembly 54 together along the seam 132. The latches 136 allow the cover member 56 to be selectively removed from the body assembly 54 in order to access internal components, such as filter element 70 during servicing. There can be a number of latches, and in the particular embodiment illustrated, there are three latches 136. As can be seen in FIGS. 2, 4, and 6, the body 55 includes a latch mount 138 thereon for each of the latches 136. In FIG. 2, it can be seen that the cover member 56 includes appropriate latch receiving structure, such as a slot 140, for receiving a hook portion 142 of each of the latches 136.

The body 55 has an open end 144 (FIG. 6) that is opposite of the end wall 114, in the illustrated embodiment. The open end 144 is circumscribed by a rim 146 that is for communicating with a receiving slot 148 (FIG. 7) in the cover member 56.

Figure 7:
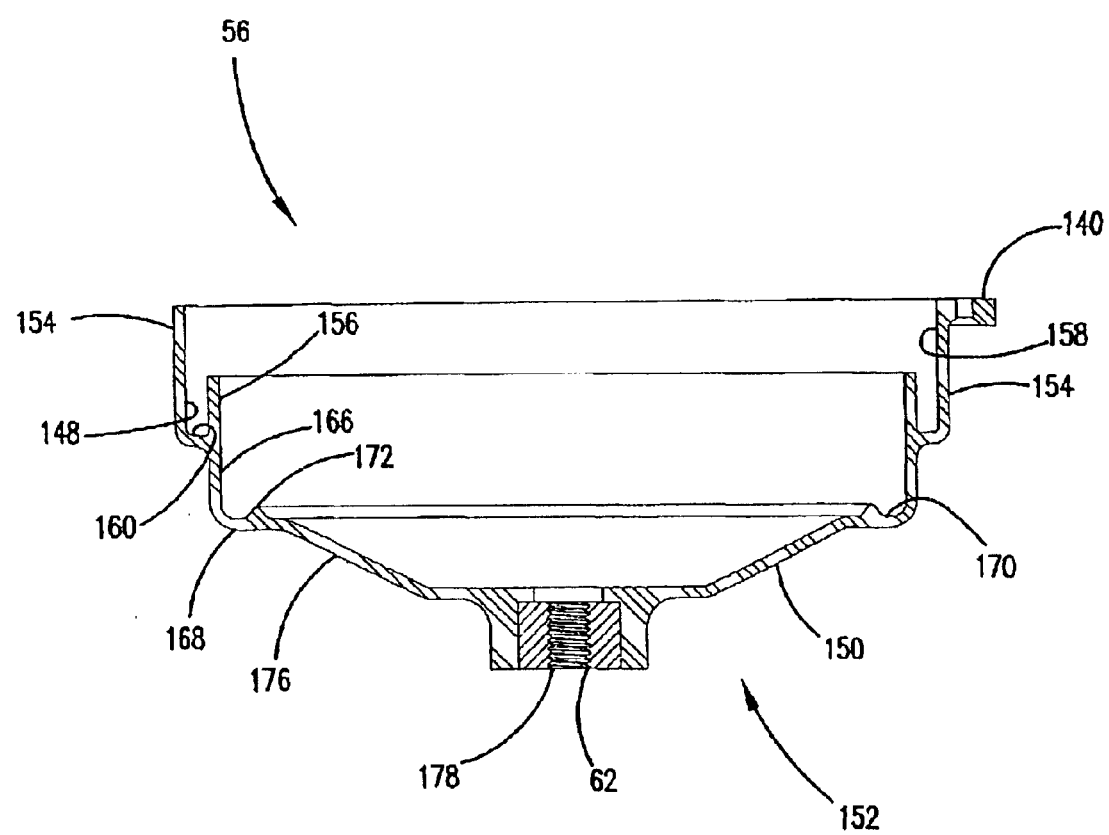
FIG. 7 is a cross-sectional view of one embodiment of the housing construction cover member; the cross-section being analogous to the cross-section taken along the line 4—4, but depicting only the housing construction cover member.

Turning now to the cover member 56 illustrated in FIG. 7, note that the cover member 56 has a bowl or funnel-shaped end second 150. The combination of bowl 150 and drain 62 comprises a liquid collection arrangement 152. In use, as liquid coalesces within the housing 52, it will drain downwardly toward the bowl 150 and will be funneled to the drain 62. Typically, appropriate drain lines will be secured to the drain 62 to direct the collected liquid as desired, for example, to an oil sump.

In reference to FIG. 7, still further detail of the illustrated cover member 56 is shown. In the particular embodiment illustrated, in the cover member 56 includes and outer surrounding wall 154 and an inner wall 156 spaced from the outer wall 154. The outer wall 154 and the inner wall 156 together define the slot 148. The slot 148 functions as a volume 158 for receipt of the body assembly 54, in particular, the rim 146. The outer surrounding wall 154 also includes the latch receiving structure 140.

The volume 158 also provides a seat 160 for holding and containing a gasket member such as O-ring 162 (FIG. 4). In the construction shown, the O-ring 162 is between the rim 146 and the seat 160. The latch arrangement 154 provides axial forces to squeeze the cover member 56 and body assembly 54 together. This provides a force of the rim 146 on the O-ring 162 to create a seal 164 (FIG. 4) between the cover member 56 and body assembly 54. This seal 164 prevents unintended amounts of gas flow to flow between the body assembly 54 and the cover member 56. Rather, the seal 164 forces the gas flow to exit through the gas flow outlet 60.

In reference again to FIG. 7, the inner wall 156 provides an annular, sealing surface 166. The annular sealing surface 166 provides a structure against which a sealing portion of the filter element 70 is oriented to create a radial seal therewith. This is described in further detail below.

The cover member 56 also includes an end wall 168 that is generally normal to the inner wall 156. The end wall 168 acts as a stop 170 for orientation of the filter element 70. In other words, the stop 170 prevents the filter element 70 from moving axially within the housing 52. Extending from the end wall 168 is a projection 172. When filter element 70 is operably installed within housing 52, the projection 172 will be pressed against a sealing portion of the filter element 70 to create a secondary seal 174 (FIG. 4) with the filter element 70. The secondary seal 174 will help to prevent unintended amounts of oil seepage from traveling from within the filter element 70 to the volume 130 outside of the filter element 70. Again, the primary sealing function is accomplished by a radial sealing system, to be described further below.

Extending from the end wall 168 is a sloped wall 176 that terminates in the liquid flow outlet 62. The sloped wall 176 forms the funnel shaped section or bowl 150.

Note that the liquid flow outlet 62 includes a threaded section 178. Threaded section 178 can be a brass insert, and is convenient for connecting fittings to lead to an oil sump, for example.

Herein, the term "gas flow direction arrangement" or variants thereof will sometimes be used to refer to the portions of arrangements that direct gas flow. For filter arrangement 50, FIG. 4, this would include the gas flow inlet 58, the inlet tube construction 72, the various walls of the housing 52 (including the walls 82, 86, 110, and 154) and the outlet tube construction 78, including the gas flow outlet 60. The gas flow direction arrangement generally operates to ensure proper gas flow, through the filter element 70 in proper order.

Attention is now directed to FIGS. 4 and 5. The filter element 70 is shown in FIG. 4 operably assembled within the housing 52. By the term "operably assembled" and variants thereof, it is meant that the filter element 70 is oriented within the housing 52 such that the seals are in place and gas flow is permitted to flow properly from the inlet 58, through the filter element 70, and out through the outlet 60.

It can be seen in FIGS. 4 and 5 that the filter element 70 includes both the first stage coalescer filter 64 and the second stage tubular construction media of 66 in a single construction. When the filter element 70 is handled, for example during servicing, both the first stage coalescer filter 64 and the second stage tubular construction of media 66 are handled together. In general, the tubular construction of media 66 includes a media pack 190 arranged in a closed, tubular form to define an open filter interior 192. In preferred constructions, the media pack 190 will be configured to have a generally cylindrical shape, defining a circular cross section.

In certain preferred arrangements, the media pack 190 includes pleated media 194 defining a plurality of pleats through which gas to be treated flows. The pleated media 194 acts as a polishing filter to remove at least some particulates and debris from the gas stream, before exiting the housing 52 through the gas flow outlet 60.

The pleated media 194 has a first end 196 and an opposite, second end 198. The length of the individual pleats of the pleated media 194 extends between the first end 196 and second end 198. In the filter element 70 shown, at the first end 196 is a first end cap arrangement 200. In the particular embodiment shown in FIG. 5, the end cap arrangement 200 includes an end cap 202 and the first stage coalescer filter 64. In preferred constructions, the end cap arrangement 200 is a single, unitary structure.

In preferred embodiments, the end cap 202 includes a ring 204 of a molded, polymeric material. The ring 204 defines a center aperture 206 that, in the preferred embodiment illustrated, is centered in the ring 204. By "centered", it is meant that the aperture 206 has a center of symmetry that is the same as the center of symmetry of the ring 204. In other words, the center 206 is preferably not eccentrically disposed within the ring 204.

In preferred arrangements, the center aperture 206 will be circular and have a diameter that is not greater than about 50 percent of the diameter of the ring 204. In some arrangements, the diameter of the aperture 206 will be less than 40 percent of the diameter of the ring 204.

The ring 204 also includes an outer, annular surface 208. When filter element 70 is operably assembled within housing 52, the outer annular sealing surface 208 functions as a sealing portion 210. In preferred arrangements, the sealing portion 210 includes a stepped construction 212.

In particular, the stepped construction 212 helps with the insertion and formation of a radial seal 214 (FIG. 4) between the end-cap arrangement 200 and the sealing surface 128 of the housing 52. In FIG. 5, the stepped construction 212 includes a first region of largest diameter 216, adjacent to a second region 218 of a diameter smaller than the first region 216, adjacent to a third region 220 of a diameter smaller than that of the second region 218. This stepped construction 212 of decreasing diameters, results in a construction that helps with the insertion of the filter element 70 in the body 55.

The sealing portion 210 of the end cap 202 is preferably made from a compressible material, such that there is radial compression of the sealing portion 210 against the sealing surface 128, when the element is operably installed in the housing 52. Example, usable materials for the sealing portion 210, and preferably the entire end cap 202, are described below. In general, preferred end caps 202 will comprise a soft, polyurethane foam having an as-molded density of typically, less than 22 lbs per cubic foot, for example about 14–22 lbs. per cubic foot.

Still in reference to FIG. 5, the end cap arrangement 200 also includes a frame construction 222 oriented in the center aperture 206 of the ring 204. The frame construction 222 holds, contains, and encapsulates a region of fibrous media 224. In the construction shown, the fibrous media 224 is used as the first stage coalescer filter 64. In certain preferred arrangements, the fibrous media 224 comprises at least one layer, and typically, a plurality of layers 226 of nonwoven, nonpleated, non open tubular, coalescing media. In the embodiment shown in FIG. 5, there are two layers 226, 228 of fibrous media 224. Certain usable, example materials for the fibrous media 224 are described further below.

Still in reference to FIG. 5, in the frame construction 220 depicted, the frame construction 222 is a multi-piece, in particular, a two-piece construction including a first frame piece 230 and a second frame piece 232. The first frame piece 230 includes a support grid 234 in covering relation to the upstream face 236 of the fibrous media 224. The support grid 234 is a porous, mesh that permits gas flow to flow therethrough and across the fibrous media 224. The support grid 234 provides structural support to the fibrous media 224.

Similarly, the second frame piece 232 includes a porous support grid 238 in covering relation to the downstream face 240 of the fibrous media 224. The support grid 238 also provides structural support for the fibrous media 224, while permitting gas flow to penetrate therethrough and into the open filter interior 192.

In the arrangement shown, the first frame piece 230 and the second frame piece 232 are arranged adjacent to each other to form a retaining pocket 242 between the support grid 234 and support grid 238 that holds or encapsulates the fibrous media 224. In certain arrangements, the first frame piece 230 and the second frame piece 232 fit together, such as by snap engagement.

As can be seen in FIG. 5, in the embodiment depicted, the frame construction 222 is molded or embedded within the polymeric end cap 202, along the inner annular region 244 of the ring 204.

The particular filter element 70 depicted further includes an inner support liner 246 and an outer support liner 248. Each of the inner liner 246 and outer liner 248 extends between the first end 196 and second end 198 of the media pack 190. The inner liner 246 and outer liner 248 help to support the pleated media 194. The liners 246 and 248, in typical arrangements, are constructed of a plastic, porous structure that permits gas flow therethrough. The outer liner 248 circumscribes the pleated media 194 and the region of fibrous media 224.

In the particular embodiment illustrated in FIG. 5, the inner liner 246 is an integral, unitary part of the second frame piece 232. That is, the inner liner 246 and the second frame piece 232 are a single member. The inner liner 246 also forms a drain surface 250 for allowing the drippage and flow of coalesced liquid from the first stage coalescer filter 64 down to the bowl 150.

The filter element 70 also includes an end cap 254 at the second end 198 of the media pack 190. The end cap 254 preferably is constructed of a molded, polymeric material, such that the pleated media 194 is potted or embedded therewithin. Similarly, the inner liner 246 and the outer liner 248, in certain preferred embodiments, extend between and are embedded within the molded, polymeric material of the first end cap 202 and second end cap 254. The second end cap 254 includes an outer annular surface 256 that forms a sealing portion 258. Preferably, the sealing portion 258 is compressible, such that it is squeezed against the sealing surface 166 of the cover member 56 when the filter element 70 is operably installed within the housing 52. The end cap 254 has an aperture 255 that is preferably aligned with the liquid flow outlet 62 to allow coalesced liquid to drain from the first stage coalescer filter 64, through the aperture 255, and exit through the outlet 62.

Attention is directed to FIG. 4. When the filter element 70 is operably installed within the housing 52, the sealing portion 258 is compressed between and against the sealing surface 166 and the outer support liner 248 to form a radial seal 260 therebetween. As can be also seen in FIG. 4, the sealing portion 210 of the first end cap 202 is compressed between and against the sealing surface 128 and the outer support liner 248 to form radial seal 214 therebetween. The radial seals 214, 260 provide for the primary sealing system within the filter arrangement 50. The radial seals 214, 260 prevent unintended amounts of gas flow to bypass either one or both of the first stage coalescer filter 64 and second stage polishing filter 66.

Attention is again directed to FIG. 5. The sealing portion 258 of the end cap 254 also preferably includes a stepped construction 262. The stepped construction 262 is analogous to the stepped construction 212 of end cap 202. In the particular embodiment illustrated, there are three steps of decreasing diameter, including step 264, step 266, and step 268. Again, the stepped construction 262 helps in insertion of the filter element 70 in the housing 52 and the formation of radial seal 260.

The end cap 254 preferably comprises a molded, polymeric material, such as molded polyurethane foam having an as-molded density of typically less than 22 lbs per cubic foot, for example, about 14–22 lbs. per cubic foot. One example material is described further below.

Note that when the end caps 202 and 254 are molded in place, the end caps 202, 254; the first and second plastic extensions 246, 248; the pleated media 194; and the non-pleated, non-woven fibrous media 24 are secured together in the form of unitary, cylindrical filter element 70.

Figure 8:
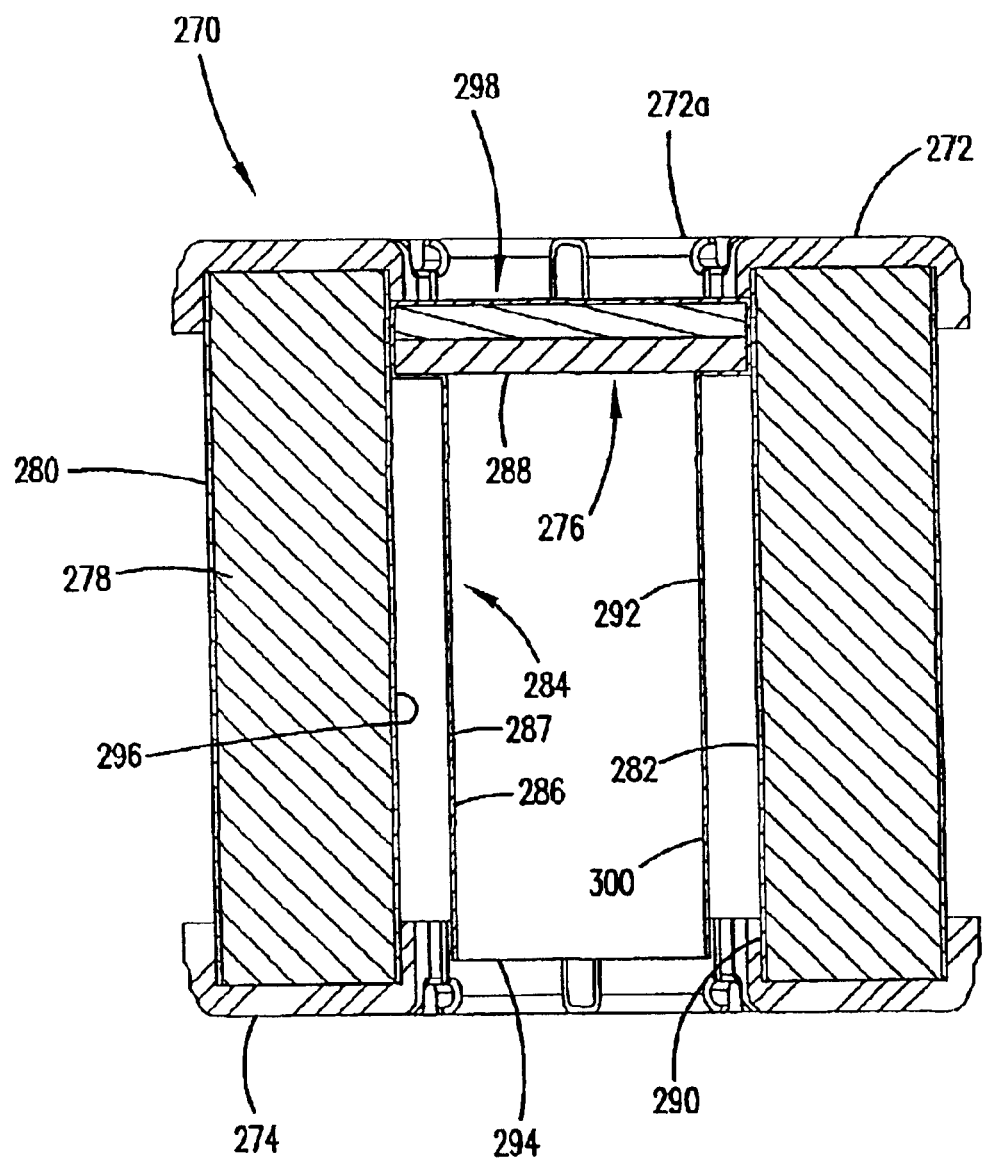
FIG. 8 is a cross-sectional view of a first alternative embodiment of a filter element that can be utilized in the filter arrangement of FIGS. 2–4; the cross-section being analogous to the cross-section of FIG. 5.

An alternative embodiment of filter element 70 is illustrated in FIG. 8 at reference numeral 270. Element 270 is analogous to the element 70 of FIG. 5, in that it includes end cap 272, end cap 274, a region of fibrous media 276, pleated media 278, and an outer liner 280. End cap 272 includes a central gas stream inlet aperture 272a. The element 270 further includes an inner support liner 282 potted within, and extending between the end caps 272, 274. In this embodiment, there is further included a flow construction 284 to aid in draining liquid that has been coalesced by the fibrous media 276.

In the embodiment illustrated in FIG. 8, the flow construction 284 includes a tube 286. In typical arrangements, the tube 286 extends from the downstream flow face 288 of the coalescer media 276 to the aperture 290 of the end cap 274. The length of the tube 286 can vary between about 33%–95% of the total length of the pleated media 278. In many cases, the tube 286 with have a length of at least 25% of the pleated media 278, and usually less than 100% of the length of the pleated media 278. In preferred embodiments, the tube 286 will have at least a section 287 that is constructed of a generally gas impermeable material, such that gas flow is required to exit from the downstream flow face 288, through the tube interior 292, past the end tip 294 of the tube 286, and then up into the volume 296 before flowing through the pleated media 278. The volume 296 is the region between the inner liner 282 and the tube 286. In the particular embodiment depicted, the entire tube 286 includes the imperforate section 287. In other embodiments, there may be portions of the tube 286 that are perforated, or gas permeable.

In the embodiment depicted, the tube 286 is part of a frame construction 298 that is used to trap, encapsulate, or hold the fibrous media 276. Typically, the frame construction 298 will be molded within the end cap 272.

The tube 286 will aid in the drainage of coalesced liquid (typically oil). In operation, the coalesced liquid will drain by gravity along the inside wall 300 of the tube 286, and then drip into the bowl 150, and then exit through the liquid flow outlet 62. The tube 286 will help to prevent coalesced liquid from being drawn into the pleated media 278.

Figure 9:
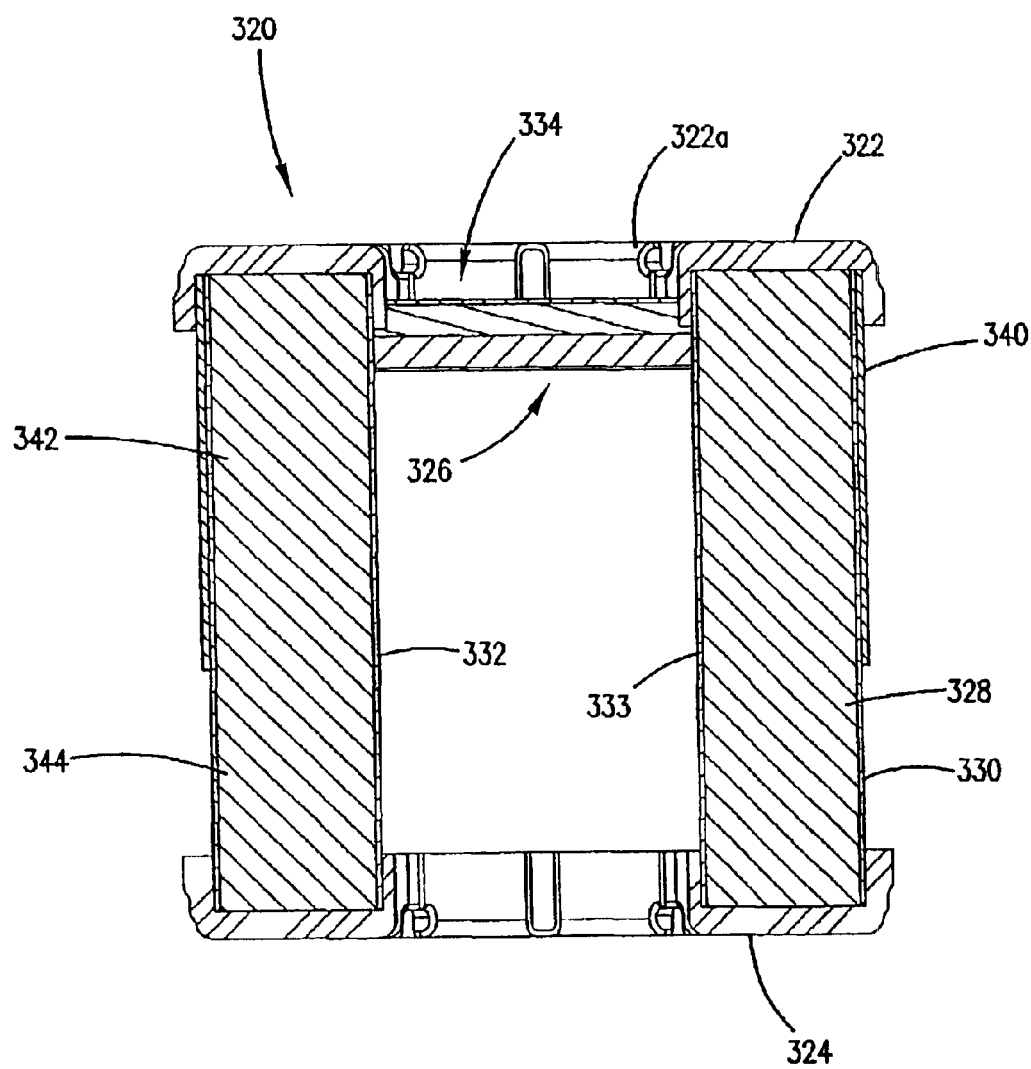
FIG. 9 is a cross-sectional view of a second alternative embodiment of a filter element that can be utilized in the filter arrangement of FIGS. 2–4; the cross-section being analogous to the cross-section of FIG. 5.

Another alternative embodiment of filter element 70 is illustrated in FIG. 9 at reference numeral 320. Element 320 is analogous to the element 70 of FIG. 5, in that it includes end cap 322, end cap 324, a region of fibrous media 326, pleated media 328, an outer liner 330, an inner liner 332, and a frame construction 334 encapsulating the fibrous media 326. End cap 322 includes a central gas stream inlet aperture 322a. The pleated media 328 defines an open tubular interior 333. The element 320 further includes an impervious outer wrap 340 circumscribing and in covering relation to the outer liner 330.

In the embodiment depicted, the outer wrap 340 extends between about 25-75% of the length of the pleated media 328, typically from the end cap 322 (holding the fibrous media 326) toward the other end cap 324 (stopping short of the end cap 324). The outer wrap 340 aids in draining liquid that has been coalesced by the fibrous media 326, as explained further. In particular, the outer wrap 340 helps to prevent gas flow through the region 342 of pleated media 328 that is masked by the wrap 340. This encourages gas flow to travel further in the direction toward the end cap 324, and to the region 344 of media 326 that is not masked by the wrap 340. This helps in the drainage by gravity of coalesced liquid out of the element 320.

A. Example Operation and Changeout

In operation, the filter arrangement 50 works as follows. Blow-by gases from an engine crankcase are taken in through the gas flow inlet port 58. The gases pass into the interior 84 of the regulator valve housing 74. The valve assembly 92 permits passage of the gas through the gap 106 between the diaphragm construction 94 and the neck 88. The gap 106 become larger as the pressure from the engine crankcase increases, causing the diaphragm construction 94 to move against the spring 96 and into the volume 108 against the lid 57. The gas then flows into the interior portion 104 of the neck 88. From there, it passes through the first stage coalescer filter 64. The first stage coalescer filter 64 is secured within the construction such that the gas is directed through the first stage coalescer filter 64 before the gas is directed through the pleated media 194.

In particular the gas flow passes through the support grid 234 and into the layer 228 of fibrous media 224. The gas continues to flow downstream and through the layer 226, and then through the support grid 238. The fibrous media 224 separates liquids, with any entrained solids, from the rest of the gas stream. The liquid flows out of the media 224 and either drips directly into the bowl 150, or drains along the drain surface 250 of the inner liner 246. The collected liquid flows along the sloped wall 176 and ultimately through the liquid flow outlet 62. This liquid material often is oil, and may be recycled to the crankcase to be reused.

The gas stream that is not coalesced by the first stage coalescer filter 64 continues on to the second stage filter 66. Specifically, the gas flow travels from the open filter interior 192 through the pleated media 194. The gas flow is prevented from bypassing this media due to the radial seals 214, 260. The pleated media 194 removes additional particles and solids from the gas stream. In the orientation shown in FIG. 4, the pleated media 194 has vertically directed pleats, such that particles and any further liquid collects or agglomerates on the pleats and falls or drain by gravity downwardly toward the bowl 150. The filtered gas then exits through the gas flow outlet port 60. From there, the gases may be directed, for example, to the turbo 34 of engine 30.

It should be noted that secondary seals 120, 174 prevent unintended amounts of collected liquid, such as oil, from seeping between the filter element 70 and the housing 52.

The filter arrangement 50 is serviced as follows. The cover member 56 is removed from the body assembly 54 by releasing the latches 136. This permits the cover member 56 to be removed from the body assembly 54. When the cover member 56 is removed from the body assembly 54, the seal 164 between the body 55 and cover member 56 is released. Further, the radial seal 260 between the filter element 70 and the cover member 56 is released. This also provides access to the filter element 70, which includes both the first stage coalescer filter 64 and the second stage tubular construction of media 66. The end of the filter element 70 adjacent to the end cap 254 is grasped, and the filter element 70 is pulled in an axial direction from the interior 112 of the body 55. As the filter element 70 is pulled from the interior 112, the radial seal 214 is released. This step removes simultaneously both the first stage coalescer filter 64 and the second stage polishing filter 66. This filter element 70 may then be disposed of, such as by incineration.

A second, new, replacement filter element 70 is then provided. The replacement element 70 also includes the first stage coalescer filter 64 and the second stage polishing filter 66 in an analogous construction as the initial filter element 70. The replacement element 70 including both the first stage 64 and second stage 66 is inserted through the open end 144 of the body 55. The filter element 70 is oriented such that the sealing portion 210 of the end cap 202 is compressed between and against the sealing surface 128 and the outer liner 248 to form radial seal 214 therebetween. In preferred embodiments, the filter element 70 is also oriented such that the end cap 202 engages and abuts the end wall 114 of the body 55. Next, the cover member 56 is placed over the end of the filter element 70 and oriented such that the sealing portion 258 of the end cap 254 is compressed between and against the outer liner 248 and the sealing surface 166 of the cover member 56. This creates the radial seal 260. In preferred arrangements, the filter element 70 is also oriented such that the end cap 254 axially engages and abuts the stop 170 of the cover member 56.

With both radial seals 214 and 260 in place, the cover member 56 is then locked to the body assembly 54 by engaging the latches 136. This also helps to create the seal 164 between the cover member 56 and body 55.

B. Example Constructions and Systems

The filter arrangement 36 is useful on a 1.5 liter–16 liter engine, 50–1200 hp, turbo charged, or super charged, diesel, or natural gas. In one application, the engine is a 250–400 hp, V-8 engine. The engine has a piston displacement of at least 3 liters, typically 7–14 liters. It typically has 8–16 cfm of blow-by gases generated. Preferred filter arrangements 36 can handle blow-by gases from 1–20 cfm.

In other systems, the filter arrangement 36 is useful on engines with the following powers: 8 kw–450 kw (11–600 hp); 450–900 kw (600–1200 hp); and greater than 900 kw (>1200 hp). In general, as the power of the engine increases, the second stage pleated media 194 will be increased in surface area. For example, for engine powers 8 kw–450 kw (11–600 hp), the length of the pleats will be about 4–5 inches; for engine powers 450–900 kw (600–1200 hp), the length of the pleats will be about 6–8 inches; and for engine powers greater than 900 kw (>1200 hp), there will typically be more than one filter arrangement 36 utilized. In other words, for engine powers greater than 900 kw (>1200 hp), there will be used two filter arrangements 36, each one having a second stage pleated media 194 with a pleat length of 4–7 inches.

It will be understood that a wide variety of specific configurations and applications are feasible, using techniques described herein. The following dimensions are typical examples:

| Structure (in.) | At least (in.) | No greater than (in.) | Typical |
|---|---|---|---|
| outer diameter of element 70 | 2 | 12 | 4–5 |
| inner diameter of element 70 | 0.5 | 10 | 1.5–2.5 |
| length of element 70 | 3 | 12 | 4–6 |
| diameter of media 224 | 0.5 | 10 | 2–2.5 |
| thickness of each layer 226, 228 | 0.05 | 1 | 0.1–0.3 |
| diameter of inlet 58 | 0.5 | 3 | 1–1.5 |
| diameter of gas flow outlet 60 | 0.5 | 3 | 1–1.5 |
| diameter of neck 88 | 0.5 | 3 | 1–1.5 |
| height of projection 116 | 0.01 | 0.25 | 0.05–0.1 |
| diameter of open end 144 | 3 | 14 | 4.5–5.5 |
| diameter of lid 57 | 3 | 14 | 4.5–5.5 |
| diameter of diaphragm 96 | 3 | 14 | 4.5–5 |
| diameter of inner wall 156 | 3 | 13 | 4.5–5 |
| diameter of outer wall 154 | 3 | 14 | 5–5.5 |
| diameter of liquid flow outlet 62 | 0.05 | 2 | 0.1–0.5 |
| height of projection 172 | 0.01 | 0.25 | 0.05–0.1 |
| length of housing 52 | 4 | 15 | 7–8 |

C. Example Materials

In this section, certain example materials useful for the embodiment of FIGS. 2–7 are described. A variety of materials may be used, other than those described herein.

The housing 50 can be plastic, such as carbon filled nylon.

The media 224 of the coalescer 64 is generally non-pleated, non-cylindrical, polyester fibrous media having an average fiber diameter of less than about 18 microns, typically about 12.5 microns and a percent solidity, free state, of no greater than about 1.05%. The media 224 has an upstream, and a downstream exposed surface area of at least 1 in.$^2$, no greater than about 7 in.$^2$, and typically about 3–4 in.$^2$ The material has an average fiber diameter of 1.5 denier (about 12.5 micron), and a solidity in a free state of at least 0.85%. It has a weight of, typically, greater than about 3.1 ounces per square yard. Typically, it has a weight less than 3.8 ounces per square yard. Typical weights are within the range of 3.1–3.8 ounces per square yard (105–129 grams per square meter). Typically, the media has a thickness at 0.002 psi compression (free thickness) of greater than about 0.32 inches. Typically, the media has a thickness at 0.002 psi compression (free thickness) of less than about 0.42 inches. Typical free thicknesses for the media are in the range of 0.32–0.42 inches (8.1–10.7 millimeters). The media has a typical permeability of no less than about 370 feet per minute (113 meters per minute).

The end caps 202, 254 may be a polymeric material. In particular, the end caps 202, 254 can be urethane, and more particularly, foamed polyurethane. One example foamed polyurethane is described in commonly assigned U.S. Pat. No. 5,669,949 for end cap 3, herein incorporated by reference. The material can be the following polyurethane, processed to an end product (soft urethane foam) having an "as molded" density of 14–22 pounds per cubic foot (lbs/ft$^3$) and which exhibits a softness such that a 25% deflection requires about a 10 psi pressure. In some embodiments, the "as molded" density varies from the 14–22 lbs/ft$^3$ range. The polyurethane comprises a material made with I35453R resin and I3050U isocyanate. The materials should be mixed in a mix ratio of 100 parts I35453 resin to 36.2 parts I3050U isocyanate (by weight). The specific gravity of the resin is 1.04 (8.7 lbs/gallon) and for the isocyanate it is 1.20 (10 lbs/gallon). The materials are typically mixed with a high dynamic shear mixer. The component temperatures should be 70–95° F. The mold temperatures should be 115–135° F.

The resin material I35453R has the following description:
(a) Average molecular weight
   1) Base polyether polyol=500–15,000
   2) Diols=60–10,000
   3) Triols=500–15,000
(b) Average functionality
   1) total system=1.5–3.2
(c) Hydroxyl number
   1) total systems=100–300
(d) Catalysts
   1) amine=Air Products 0.1–3.0 PPH
   2) tin=Witco 0.01–0.5 PPH
(e) Surfactants
   1) total system=0.1–2.0 PPH
(f) Water
   1) total system=0.03–3.0 PPH
(g) Pigments/dyes
   1) total system=1–5% carbon black
(h) Blowing agent
   1) 0.1–6.0% HFC 134A.

The I3050U isocyanate description is as follows:
(a) NCO content—22.4–23.4 wt %
(b) Viscosity, cps at 25° C.=600–800
(c) Density=1.21 g/cm$^3$ at 25° C.
(d) Initial boiling pt.—190° C. at 5 mm Hg
(e) Vapor pressure=0.0002 Hg at 25° C.
(f) Appearance—colorless liquid
(g) Flash point (Densky-Martins closed cup)=200° C.

The materials I35453R and I3050U are available from BASF Corporation, Wyandotte, Mich. 48192.

The frame construction 222, inner liner 246, outer liner 248, and screens 234, 238 can be constructed of plastic, such as carbon filled nylon.

The pleated media tubular filter 194 is preferably constructed of an oleo-phobic material. One example is synthetic glass fiber filter medium, coated and corrugated to enhance performance in ambient air-oil mist conditions. The media 194 has a face velocity of at least 0.1 ft/min., no greater than 5 ft/min., and typically about 0.3–0.6 ft./min. The pleat depth is no less than 0.5 in., no greater than 3 in., and typically about 0.75–2 in. The pleat length is at least 1 in., no greater than 15 in., and typically 3–6 in. The pleated media 194 has an upstream media surface area of at least 2 ft$^2$ and preferably about 3–5 ft$^2$. There are at least 30 pleats, no greater than about 150 pleats, and typically about 60–100 pleats. The synthetic glass fiber filter media may be coated with a low surface energy material, such as an aliphatic fluorocarbon material, available from 3M of St. Paul, Minn. Prior to coating and corrugating, the media has a weight of at least 80 pounds/3000 sq. ft; no greater than about 88 pounds/3000 sq. ft; typically in a range from about 80–88 pounds/3000 square feet (136.8±6.5 grams per square meter). The media has a thickness of 0.027±0.004 inches (0.69±0.10 millimeters); a pore size of about 41–53 microns; a resin content of about 21–27%; a burst strength, wet off the machine of 13–23 psi (124±34 kPa); a burst strength wet after 5 minutes at 300° F. of 37±12 psi (255±83 Idea); a burst strength ratio of about 0.30–0.60; and a permeability of 33±6 feet per minute (10.1±1.8 meters per minute). After corrugating and coating, the media has the following properties: corrugation depth of about 0.023–0.027 inches (0.58–0.69 millimeters); a wet tensile strength of about 6–10 pounds per inch (3.6±0.91 kilograms per inch); and a dry burst strength after corrugating of no less than 30 psi (207 kPa).

The ratio of the upstream surface area of the coalescer media 224 to the upstream surface area of the pleated media 194 is less than 25%, typically less than 10%, and in some instances, less than 1%. The ratio of the downstream surface area of the coalescer media 224 to the upstream surface area of the pleated media 194 is less than 25%, typically less than 10%, and in some instances, less than 1%.

The housing 52 may be constructed of a molded plastic, such as glass filled nylon. The diaphragm construction 94 can be constructed of a deflectable material, such as rubber.

III. The Embodiments of FIGS. 10–15

Figure 10:
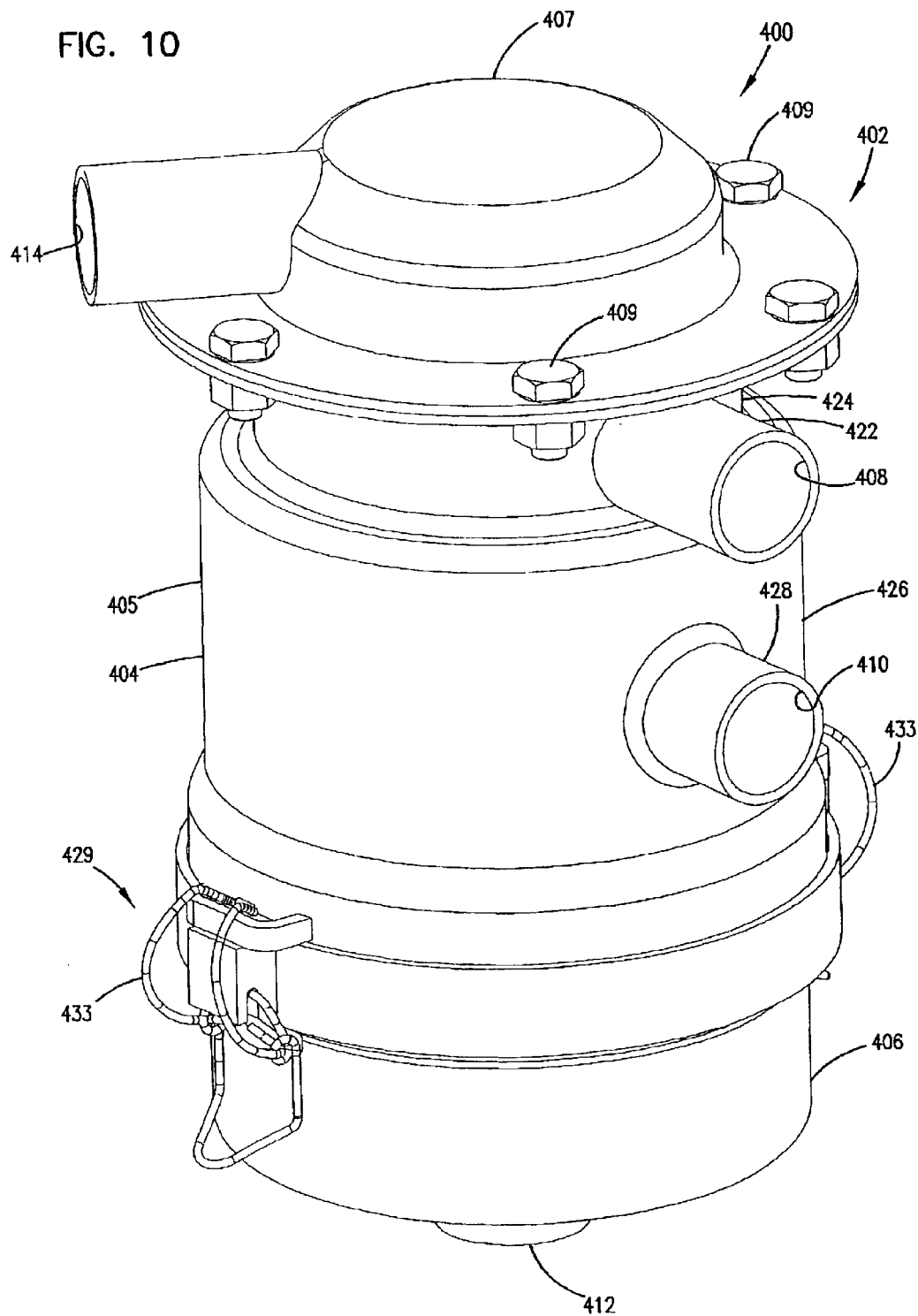
FIG. 10 is a perspective view of another embodiment of a filter arrangement, constructed according to principles of this disclosure.
Figure 11:
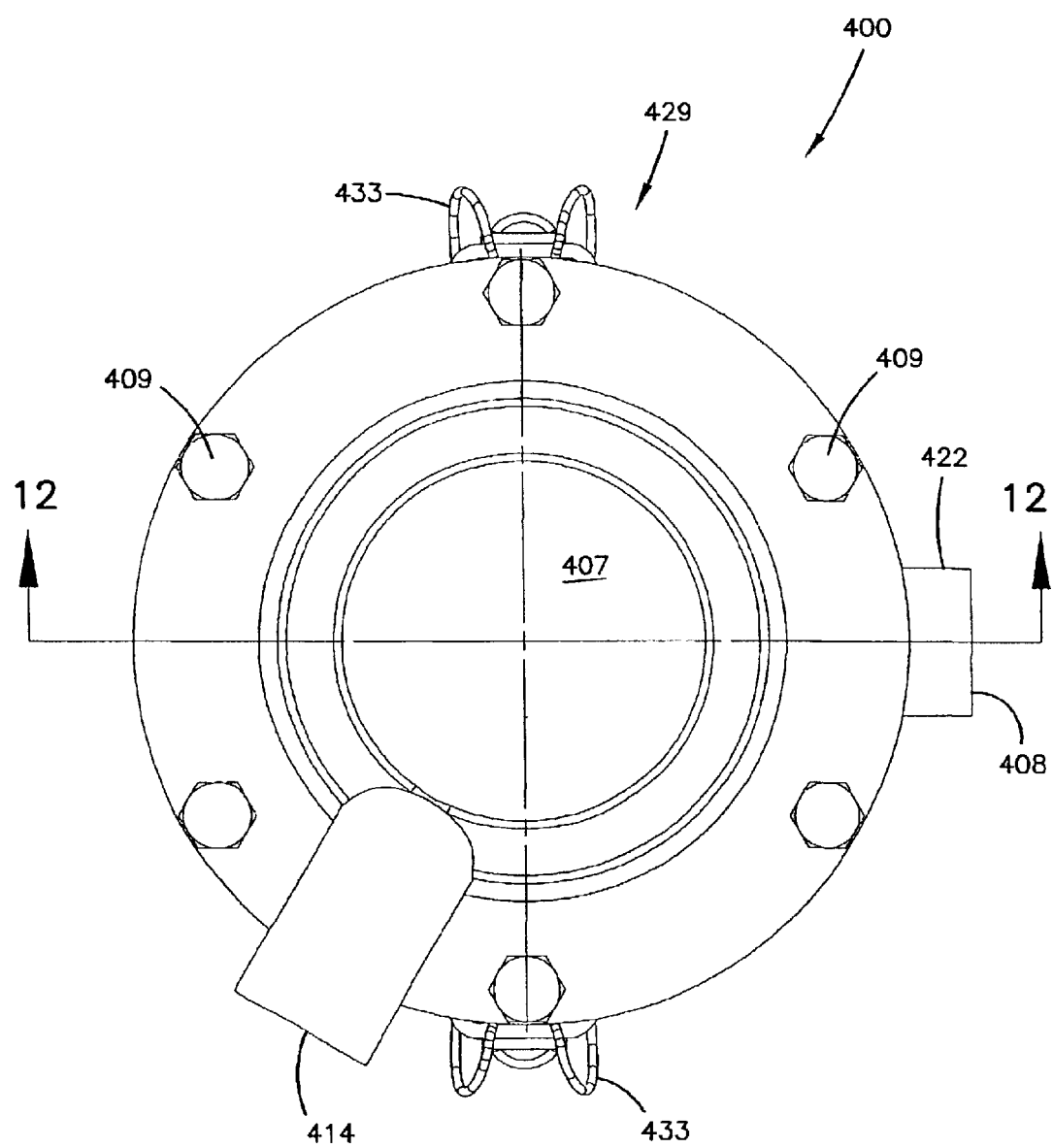
FIG. 11 is a top plan view of the filter arrangement depicted in FIG. 10.
Figure 12:
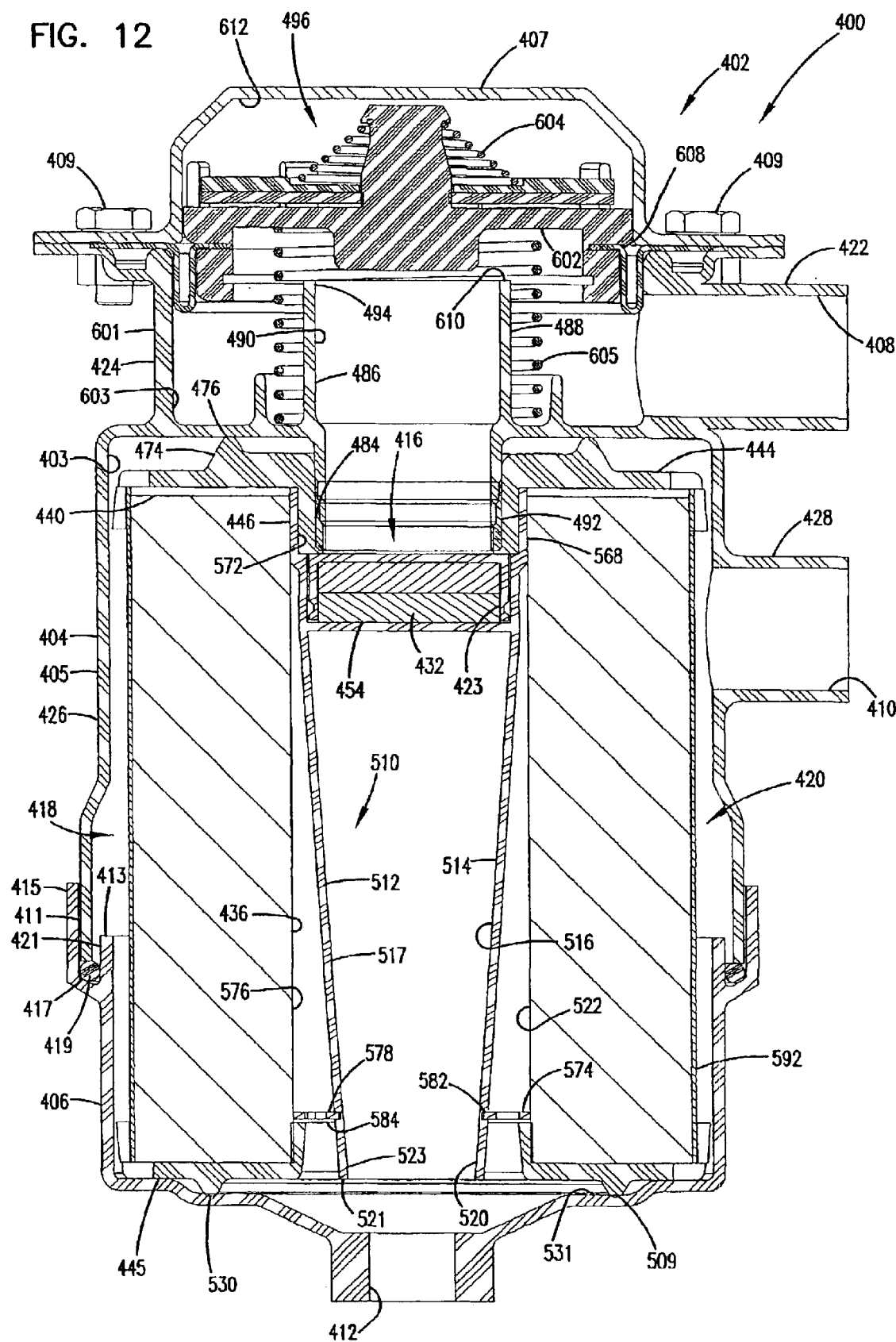
FIG. 12 is a cross-sectional view of the filter arrangement depicted in FIGS. 10 and 11, and taken along the line 12—12 of FIG. 11.

Another alternative embodiment of a coalescer filter and gas cleaner arrangement is depicted in FIGS. 10–12 at 400. The gas cleaner filter arrangement 400 includes a housing 402. The depicted housing 402 has a two-piece construction. More specifically, housing 402 comprises a body assembly 404 and a removable cover member 406. The body assembly 404 includes body 405 and lid 407.

Housing 402 includes the following four ports: gas flow inlet port 405; gas flow outlet port 410; port 412; and gas flow bypass outlet port 414. In general, and in reference now to FIG. 12, the gas cleaner filter arrangement 400 includes first stage coalescer filter 416 and second stage filter media 418. In use in the arrangement shown, the port 412 acts as a liquid flow outlet port or liquid drain 412. In the arrangement shown, a liquid entrained gas stream is directed through the gas flow inlet port 408 and then through the first stage coalescer filter 416. At least a portion of the liquid phase is coalesced and removed from the gaseous stream by the first stage coalescer filter 416. The liquid that is coalesced within the first stage coalescer filter 416 drains and exits the housing 402 through the liquid flow outlet port 412. The gas phase is directed from a flow passageway 423 in the first stage coalescer 416 through the second stage filter media 418. The media construction 418 removes at least a portion of particulates from the gas stream, and the cleaned gas stream is then directed outwardly from the housing 402 through the gas flow outlet port 410.

Figure 13:
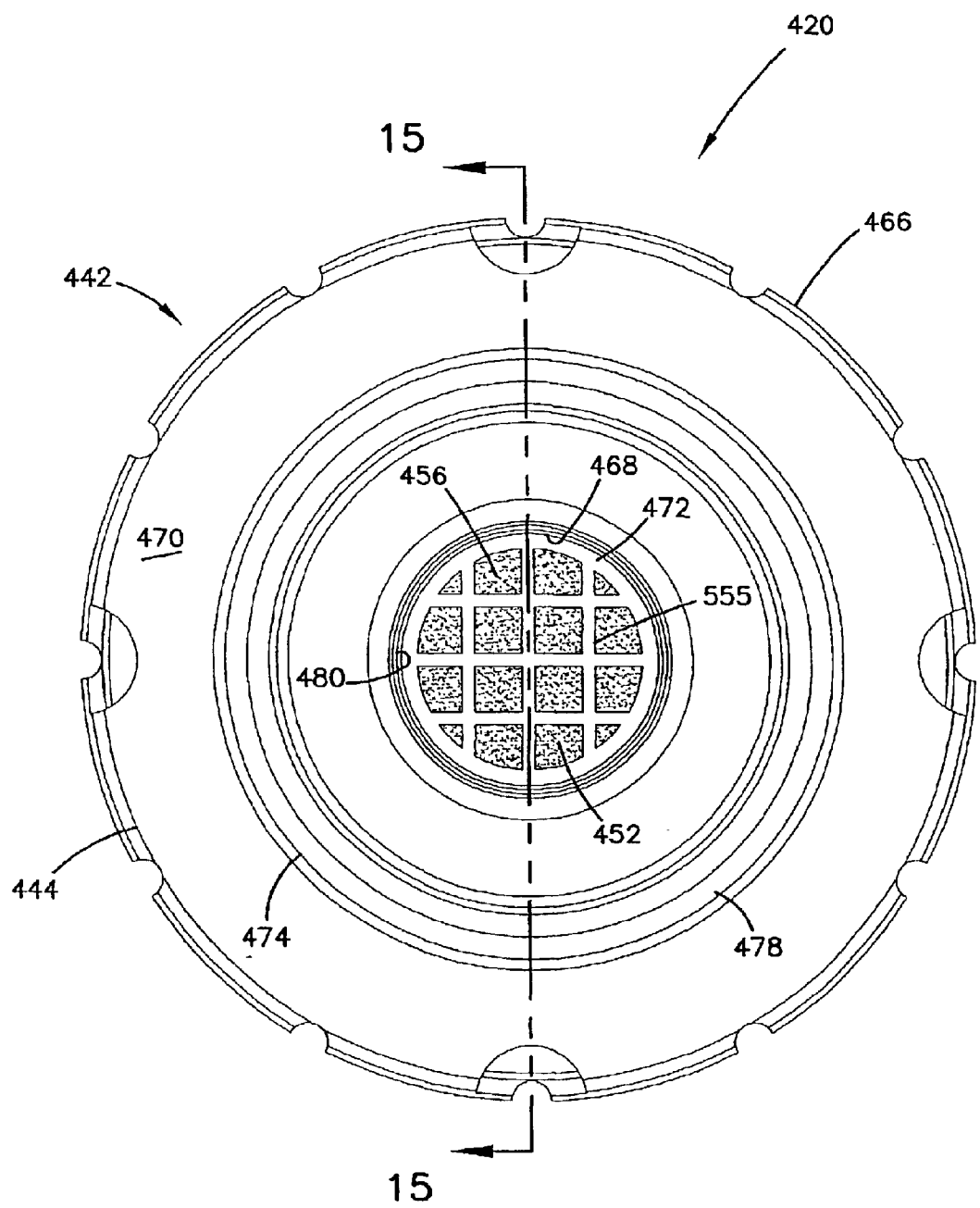
FIG. 13 is an end view of one embodiment of a filter element utilized in the filter arrangement of FIGS. 10–12.
Figure 14:
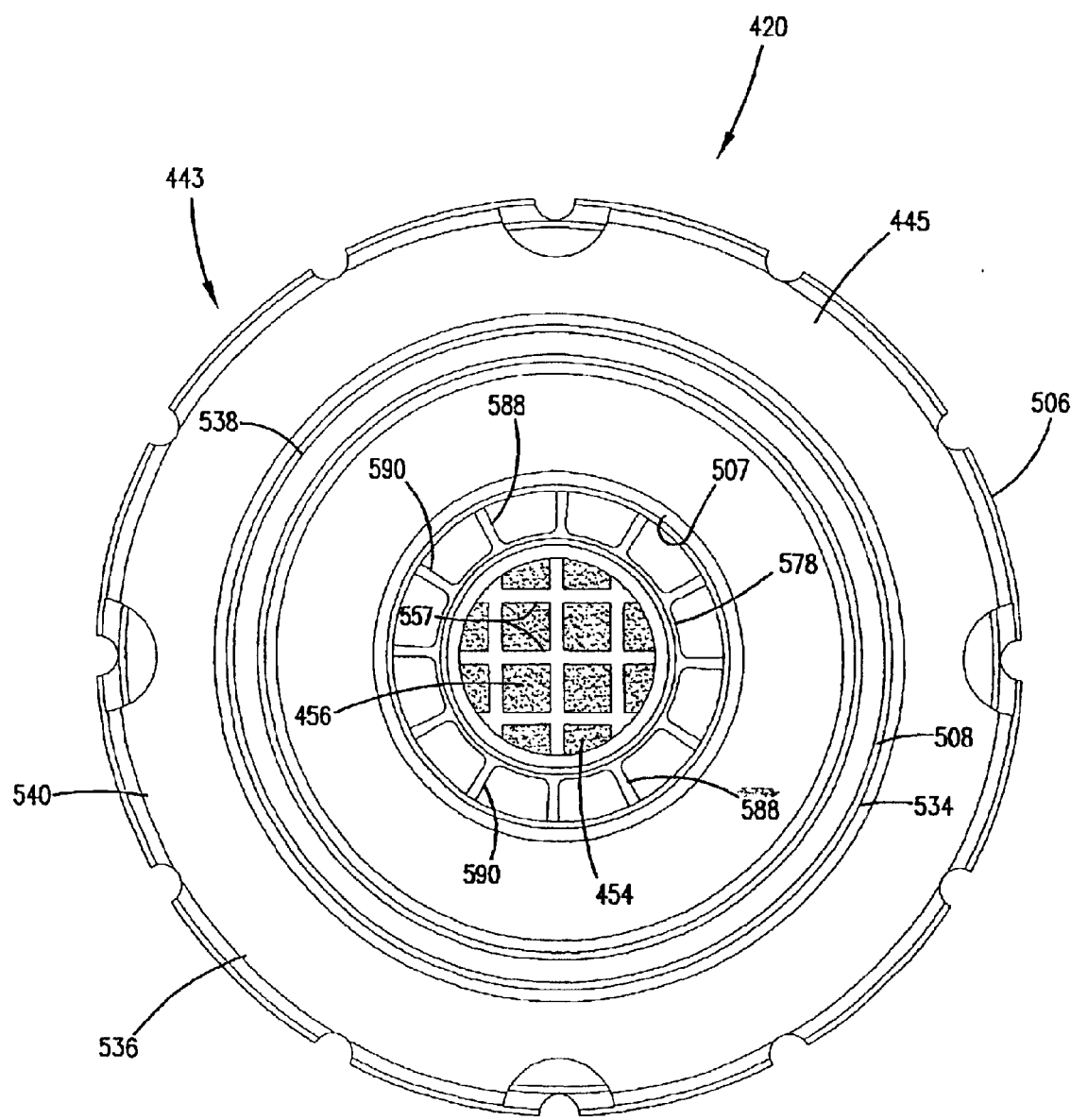
FIG. 14 is an opposite end view of the filter element depicted in FIG. 13.
Figure 15:
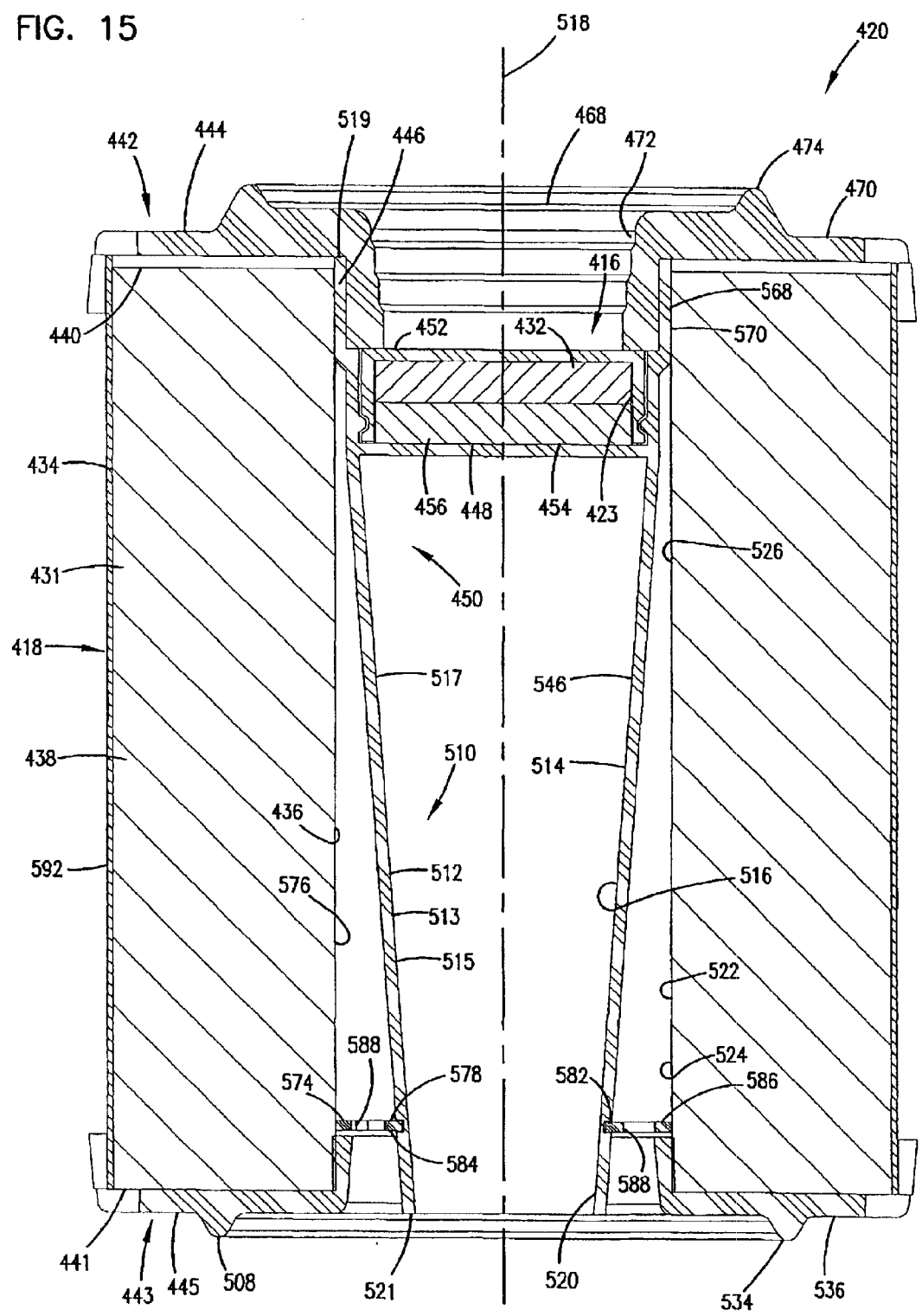
FIG. 15 is a cross-sectional view of the filter element depicted in FIGS. 13 and 14, the cross section being taken along the line 15—15 of FIG. 13.

As with the embodiment depicted in FIG. 5, the first stage coalescer filter 416 and the second stage filter media 418 are a single, unitary construction forming a filter arrangement or element 420 (FIGS. 13–15). In preferred designs, the filter element 420 is removable and replaceable from the housing 402. As with the embodiment of FIG. 5, "unitary" means that the first stage coalescer filter 416 and second stage media 418 cannot be separated without destroying a portion of the element 420. In preferred embodiments, the first and second end caps 444, 445 are part of the unitary construction.

In reference again to FIGS. 10 and 12, for the body assembly 404 depicted, there is an inlet tube construction 422, a valve housing 424, a canister portion 426, and an outlet tube construction 428. In the embodiment shown, each of the inlet tube construction 422, valve housing 424, canister portion 426, and outlet tube construction 428 comprise a portion of the body 405. Together with the lid 407, the body 405 and the lid 407 are part of the body assembly 404. The lid 407, in the embodiment depicted, is secured to the body 405 through selectively removable mechanical engagement, such as a bolt arrangement 409. The bolt arrangement 409 provides selective access to a regulator valve assembly 496.

The filter element 420 is constructed and arranged to be removably mountable within the housing 402. That is, the filter element 420 and the housing 402 are designed such that the housing 402 can be selectively opened in order to access the filter element 420. The filter element 420 is designed to be selectively mountable and removable from within an interior 403 of the housing 402. When the filter element 420 is oriented as shown in FIG. 12, with all of the seals (to be described below) in place, the filter element 420 is considered to be operably installed within the housing 402.

As mentioned above, the housing 402 is designed to be selectively openable in order to access the filter element 420. In the particular embodiment illustrated, the cover member 406 is secured to the body 405 through a latch arrangement 429. The latch arrangement 429 preferably selectively holds the cover member 406 tightly and securely to and against the body 405, when the latch arrangement 429 is in a locked state. In the one depicted, the latch arrangement 429 includes at least two latches 433, and in this embodiment, first and second wire latches 433.

In reference to FIG. 12, note that the body 405 and cover member 406 include a seal arrangement 421. In particular, note that the cover 406 includes a pair of opposing flanges 413, 415 defining a receiving slot 417 therebetween. The body 405 includes a flange 411 that fits in the slot 417. Preferred embodiments also include an O-ring seal member 419 seated within the slot 417.

FIG. 15 depicts the filter element 420 as it would appear in an uninstalled state, that is, when it is not mounted within the housing 402. FIG. 13 shows an end view of the filter element 420, while FIG. 14 shows an opposite end view of the filter element 420. In general, filter element 420 includes at least second and first regions 431, 432 of filter media. In the filter element 420 depicted in the drawings, the second region of filter media 431 includes a tubular extension 434 that defines a tubular open filter interior 436. The second region of media 431 also comprises the second stage filter media 418, when the filter element 420 is installed in the filter arrangement system 400. In preferred constructions, the tubular extension of media 434 is configured to have a generally cylindrical shape, defining a circular cross-section. In certain preferred arrangements, the second region of media 431 includes fluted or pleated media 438 defining a plurality of pleats through which gas to be treated is forced to flow through. The pleated media 438, when installed in the filter arrangement 400, preferably acts as a polishing filter to remove at least some particulates and debris from the gas stream, and in certain instances, a portion of the entrained liquid, before the gas stream exits the housing 402.

The pleated media 438 has a first end 440 and an opposite second end 441. The length of the individual pleats, in preferred embodiments, extends between the first end 440 and the second end 441. In the filter element 420 shown, at the first end 440, is a first end cap arrangement 442. In the particular one shown, the first end cap arrangement 442 includes an end cap 444 and a rigid, pre-formed insert 446 molded therein. In preferred constructions, the first end cap arrangement 442 is a single, unitary structure. As will be described further below, the pre-formed insert 446 includes a frame construction 450, which holds the first stage coalescer filter 416 in operable assembly.

Still in reference to FIG. 15, at the second end 441 of the pleated media 438, is a second end cap arrangement 443. The second end cap arrangement 443 includes at least a second end cap 445.

As mentioned above, the filter element 420 includes at least the second and first regions of media 431, 432. In preferred arrangements, the second region of media 431 includes pleated media 438. The first region of media 432, in preferred embodiments, is oriented in extension across the tubular extension 434 of the second region of media 431 to be in gas flow communication with the open filter interior 436. By the phrase "oriented in extension across the tubular extension", it is meant that the first region of media 432 does not radially overlap the second region of media 431 to itself form a tubular extension; rather, the first region of media 432 extends across and covers the end cap aperture 445. The first region of media 432 may be itself embedded within the end cap 444 or be oriented adjacent to but spaced from the end cap 444 in a direction toward the end cap 445. The first region of media 432 is not necessarily contained within a single plane, but in preferred embodiments, the first region of media 432 is a non-tubular, non-cylindrical, generally panel construction 448. By "panel construction" it is meant that the first region of media 432 permits gas flow to maintain a generally straight path therethrough. That is, the gas flow is not required to turn a corner as it flows from an upstream face 452 to a downstream face 454.

Figure 15A:
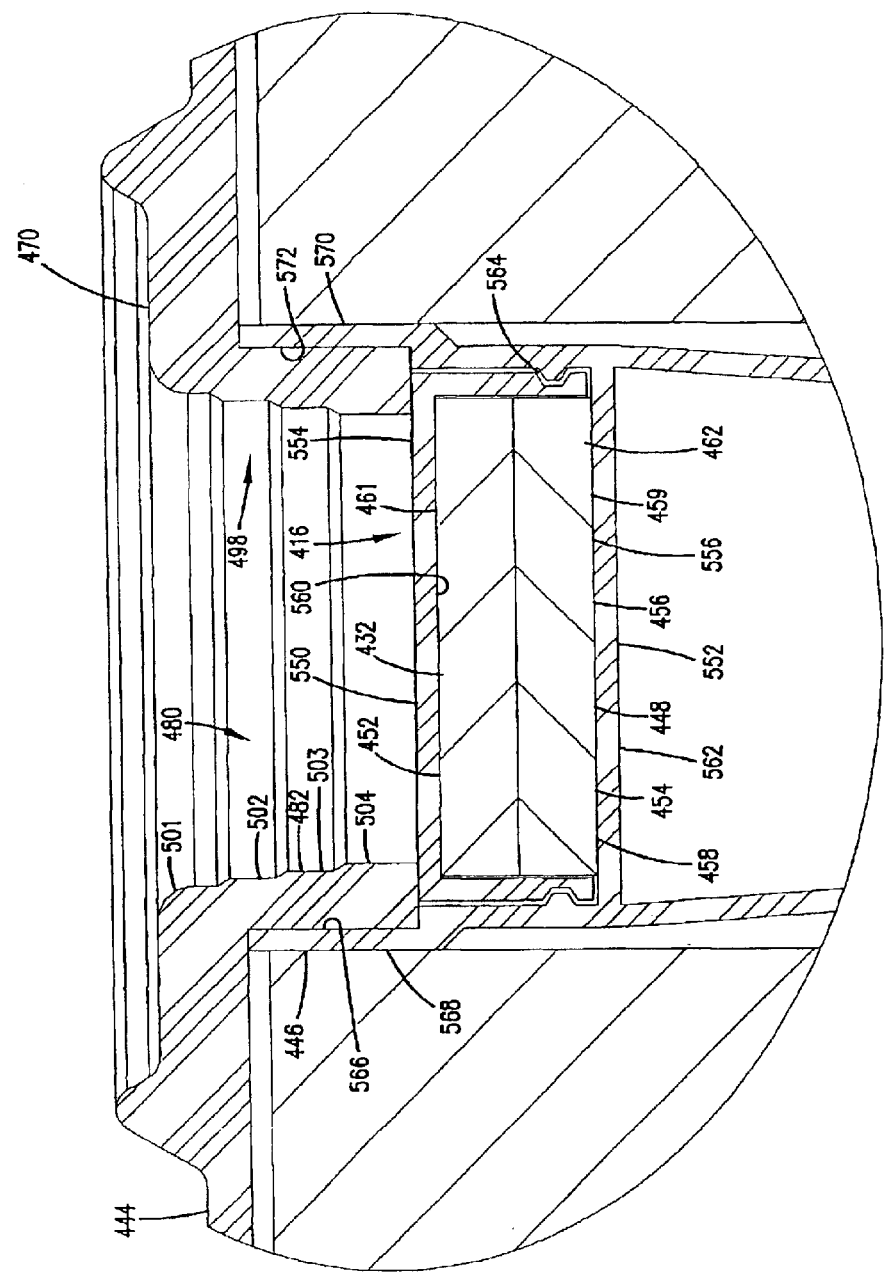
FIG. 15A is an enlarged, fragmented cross-sectional view of a portion of the filter element depicted in FIG. 15.

In preferred embodiments, and in reference to FIG. 15A, the first region of media 432 also corresponds to the first stage coalescer filter 416. In preferred embodiments, the first region of media 432 includes fibrous media 456. In certain preferred embodiments, the fibrous media 456 includes at least one layer, and preferably, a plurality of layers 458 of a fibrous bundle of non-woven, non-pleated, non-open tubular, coalescing depth media 459. In the embodiments shown in FIGS. 12 and 15, there are two layers 461, 462 of fibrous depth media 459. Preferred materials for the fibrous media 456 are described above in connection with media 224 of FIG. 5.

Attention is directed to FIG. 13, where the first end cap 444 is shown in plan view. In preferred embodiments, the end cap 444 includes a ring 466 of a molded, polymeric material. The ring 466 defines a center aperture 468 that, in the preferred embodiment illustrated, is centered in the ring 466. In other words, the aperture 468 has a center of symmetry that is the same as the center of symmetry of the ring 466. In the particular embodiment illustrated, the center aperture 468 is circular. The aperture 468 functions as a gas stream inlet aperture. The aperture 468 is preferably aligned (either overlapping or coaxial with) the flow passageway 423 of the first stage coalescer filter 416.

The end cap 444 includes an axial portion 470 and an annular or radial portion 472. The aperture 468 provides for gas flow communication with the open filter interior 436. The axial portion 470 of the end cap 444 includes at least one continuous projection 474. In preferred embodiments, the continuous projection 474 helps to form a secondary seal 476 (FIG. 12) with the housing 402, when the filter element 420 is operably installed within the housing interior 403. In the particular embodiment illustrated in FIG. 13, the continuous projection 474 forms a circular ring 478.

The radial portion 472 of the end cap 444 forms an annular sealing portion 480. When the filter element 420 is operably assembled within the housing 402, the annular sealing portion 480 forms a seal member 482. In the preferred embodiment shown in FIG. 13, the seal member 482 is along the inner annular surface of the ring 466, to circumscribe the aperture 468.

When the filter element 420 is operably installed within the housing 402, the seal member 482 forms a radial seal 484 with the housing 402. In particular, in the arrangement shown in FIG. 12, the body 405 of the housing 402 includes an internal tube 486. The tube 486 includes a rigid wall 488 that circumscribes and defines a gas flow aperture 490. When constructed as shown in FIG. 12, the wall 488 has a sealing portion 492 that is designed to extend through the aperture 468 of the end cap 444 and into the open filter interior 436. The wall 488 also has an end portion 494 that may, in certain instances, interact with valve assembly 496. The valve assembly 496, its operation, and its interaction with the wall 488 are discussed in further detail below.

In FIG. 12, it can be seen that the radial seal 484 is formed against the sealing portion 492 of the tube 486. In preferred embodiments, the radial seal 484 is formed by compression of the material of the first end cap 444 between and against the sealing portion 492 of the tube 486 and the pre-formed insert 446 embedded within the end cap 444. In this context, by "between and against" it is meant that the material of the first end cap 444 extends transversely the distance between the sealing portion 492 of the tube 486 and the pre-formed insert 446, and is compressed in dimension due to the rigidity of portion 492 and insert 446.

In reference now to FIG. 15A, the annular sealing portion 480, in the particular preferred embodiment illustrated, includes a stepped construction 498. The stepped construction 498 helps with the insertion and formation of the radial seal 484 between the end cap arrangement 442 and the sealing portion 492 of the housing 402. In the preferred embodiment illustrated, the stepped construction 498 includes a plurality of regions of decreasing diameters, extending from the axial portion 470 of end cap 444 to the upstream face 452 of the fibrous media 456. In FIG. 15A, the stepped construction 498 includes a first region of largest diameter 501, adjacent to a second region 502 of a diameter smaller than the first region 501, adjacent to a third region 503 of a diameter smaller than that of the second region 502, adjacent to a fourth region 504 smaller than that of the third region 503. This stepped construction 498 of decreasing diameters results in sealing portion 480 that helps with the insertion of the filter element 420 into the housing 402 and the formation of the radial seal 484.

The sealing portion 480 of the end cap 444 is preferably made from a compressible material, such that there is radial compression of the sealing portion 480 against the sealing portion 492 of the tube 486 of the housing 402. In general, preferred end caps 444 comprise a soft, polyurethane foam having an as-molded density of about 14–22 pounds per cubic foot. One usable material is described above in connection with the sealing portion 410; another usable material is described further below.

Referring again to FIG. 12, the filter arrangement 400 preferably includes a flow construction arrangement 510 oriented to direct fluid, such as coalesced liquid, from the first region of media 432 toward the liquid flow outlet 412. In general, the flow construction arrangement 510 preferably includes a tube 512 formed by a section 513 of impervious, continuous, uninterrupted wall 514 surrounding and defining an open, fluid passage 516. In preferred embodiments, the tube 512 extends from the downstream face 454 of the first stage coalescer filter 416 at least partially in a direction toward the second end cap 445. In preferred embodiments, the tube 512 extends a complete distance between the downstream face 454 and the second end cap 445. In the particular arrangement depicted, the tube 512 forms an aperture 520, preferably a fluid exit aperture 523, at the end 521 of the wall 514 adjacent to the second end cap 445. In this manner, in this particular arrangement, liquid that is coalesced by the first stage coalescer filter 416 is allowed to collect along the interior 517 of the tube 512 and drip by gravity to the liquid flow outlet port 412. Alternate drain arrangements are also usable. While in the depicted embodiment, the entire wall 514 includes the imperforate section 513, in other embodiments, only portions of the wall 514 will be imperforate.

In the embodiment of FIG. 8, the flow construction arrangement 284 was depicted in the drawing as being generally straight, and unangled. In the embodiment of FIGS. 12 and 15, the flow construction arrangement 510 is depicted as a conical section 515 having a sloped or tapered wall 514. In preferred constructions, the angle of taper on the wall 514 will be adjusted depending upon the overall length of the element 420. That is, in preferred constructions, the size of the aperture 468 generally remains fixed. As the length of the pleats of the pleated media 438 becomes greater, the length of the overall element 420 becomes greater, and the angle or taper of the wall 514 decreases. In many preferred arrangements, the angle of taper, as measured from a longitudinal axis 518 (FIG. 15) passing through the symmetrical center of the element 420, is at least 1° extending from end 519 (adjacent to the coalescer filter 416) to end 521. In some arrangements, the angle of taper can be 2–15°, and typically less than 45°. The taper or angle on the wall 514 helps to direct the coalesced liquid in the direction of the fluid exit aperture 520 and ultimately through the liquid flow outlet port 412.

After passing through the first stage coalescer filter 416, the gas flows through the fluid passageway 516, out through exit aperture 520, and then into a gas flow plenum 522. The gas flow plenum 522 is formed between the wall 514 of the tube 512 and the pleated media 438. The taper on the wall 514 causes the gas flow plenum 522 to be angled between a volume 524 adjacent to the second end cap 445 and a volume 526 adjacent to the first end cap 444 that is smaller than volume 524.

In reference now to FIG. 14, the depicted second end cap 445 includes a ring 506 defining a center aperture 507. The aperture 507 allows for the passage of liquid collected by the first stage coalescer filter 416 to exit the filter element 420, in the particular system depicted in FIG. 12. The end cap 445 supports a sealing arrangement 508 for forming a seal 509 (FIG. 12) with the housing 402. In the embodiment illustrated in FIG. 12, the particular seal 509 depicted is an axial seal 530 formed between the filter element 420 and an inner sealing surface 531 of the cover member 406. In preferred embodiments, the sealing arrangement 508 includes a projection 534 extending or projecting in an axial direction from a generally flat, planar portion 536 of the second end cap 445. In many preferred embodiments, the projection 534 forms a continuous ring 538. Preferred constructions include the end cap 445 and the projection 534 being a single, unitary, molded construction 540. In preferred embodiments, the end cap construction 540 is made from a polymeric material, preferably, a compressible polymeric material such as polyurethane. In many preferred embodiments, the second end cap 445 is made from the same material as the first end cap 444. The axial seal 530 helps to prevent gas from the inlet port 408 from bypassing the first stage coalescer filter 416 and the second stage construction of filter media 418. The axial seal 530 also helps to prevent the seepage of liquid such as oil from passing to the downstream side of the second stage filter media 418.

As mentioned above, the first end cap arrangement 442 includes pre-formed insert 446. In the embodiment depicted in FIGS. 12 and 15, the pre-formed insert 446 includes frame construction 450 for holding and encapsulating the fibrous media 456. The frame construction 450 is now further described. In reference to FIG. 15, the particular frame construction 450 depicted is a multi-piece construction 546. In the embodiment shown in FIG. 15A, the multi-piece construction 546 includes at least a first frame piece 550 and a second frame piece 552. The first frame piece 550 includes a support grid 554 in covering relation to the upstream flow face 452 of the fibrous media 456. Preferably, the support grid 554 is a porous, mesh screen 555 (FIG. 13) that permits gas flow, including gas entrained with liquid, to flow therethrough and across the coalescer media 456. The screen 555 also provides structural support to the fibrous media 456.

Similarly, the second frame piece 552 includes a support grid 556 supporting and in covering relation to the downstream flow face 454 of the fibrous media 456. The support grid 556 preferably includes a porous, mesh screen 557 (FIG. 14) and provides structural support for the fibrous media 456 while permitting gas and coalesced liquid to pass therethrough and into the fluid passageway 516 of the flow construction arrangement 510.

In the arrangement shown, the first frame piece 550 and the second frame piece 552 are oriented adjacent to each other to form a retaining pocket 560 between the screen 555 and the screen 557 to form a housing 562 that holds or encapsulates the fibrous media 456. In preferred embodiments, the first frame piece 550 and the second frame piece 552 mechanically engage, for example, through interlock structure such as a snap engagement 564.

In preferred embodiments, the pre-formed insert 446 forming the frame construction 450 is molded or embedded within the polymeric end cap 444 along an inner annular region 566 of ring 568. Ring 568, in the embodiment depicted in FIGS. 12 and 15, is integral with and the same piece as the second frame piece 552. The ring 568 generally comprises a surrounding wall 570 in projection or extending from screen 555 to the first axial end 440 of the pleated media 438. As can be seen in FIG. 15A, the wall 570 forms a rigid, backstop a to the compression of the end cap material in the sealing portion 480. That is, in preferred constructions, the radial seal 484 is formed by compression of the sealing portion 480 between and against the backstop 572 and the sealing portion 492 of the wall 488.

As also can be appreciated from reviewing FIGS. 12, 15 and 15A, preferred embodiments include the tube 512 of the flow construction arrangement 510 as an integral, unitary part of the second frame piece 552. As such, in the embodiment illustrated in FIGS. 12 and 15, the particular second frame piece 552 shown, extends from the end 440, which forms the backstop 472, along the length of the pleated media 438, to the end 521 forming the exit aperture 520.

Still in reference to FIGS. 12 and 15, preferred frame constructions also include a support ring or frame 574. The support frame 574 helps to center the frame construction 450 and to hold the frame construction 450 evenly within the open filter interior 436. The support frame 574 can be a variety of arrangements and constructions that provide for structural rigidity between the tube 512 and an inner perimeter 576 of the pleated media 438. In the particular one depicted in FIGS. 12, 14 and 15, the support frame 574 includes a ring construction 578. The ring construction 578 depicted mechanically engages the wall 514 adjacent to the end 521, such as by a snap engagement 582. The ring construction 578 depicted includes at least an inner ring 584, which engages the wall 514, and an outer ring 586, which may touch or be close to the inner perimeter 576 of the second stage tubular construction of filter media 418. The inner ring 584 and outer ring 586 define a plurality of gas flow apertures 588 therebetween, separated by a plurality of spokes or ribs 590. The ribs 590 provide for structural support and integrity of the ring construction 578. The gas flow apertures 588 allow for the passage of gas from the first stage coalescer filter 416 to the second stage filter media 418. That is, after the gas flow has passed through the first stage coalescer filter 416 and through the fluid passage 516, it flows through the fluid exit aperture 520, turns a corner (about 180°) around the end 521 of the wall 514 and flows through the plural apertures 588 into the gas flow plenum 522. From there, the gas flows through the tubular extension of media 434.

In certain embodiments, the filter element 420 will also include an outer support 592, such as a liner 594. In preferred arrangements, the support 592 will extend between the first and second end caps 444, 445, and help to hold or provide support to the pleated media 438. In some embodiments, the liner 594 includes expanded metal. In many arrangements, the liner 594, as well as the other parts of the element 420, will be non-metallic (at least 98% non-metallic, and preferably 100% non-metallic material). In alternate embodiments, instead of a liner 594, the pleated media 438 will include a support band or roving.

As mentioned above, preferred filter arrangements 400 include valve assembly 496. In the preferred embodiment illustrated in FIG. 12, the valve assembly 496 provides both a regulator valve function and a bypass valve function. The regulator valve function is first described. The valve housing 424 includes an outer surrounding wall 601 defining an open interior 603, where the gas be treated, which flows from the engine crank case through the inlet port 408, is allowed to flow and collect before passing into the filter element 420. In the illustrated valve assembly 496, there is a diaphragm 602 and a biasing mechanism, such as spring 605. In preferred embodiments, the diaphragm 602 is generally circular that is held by and rests upon a shelf 608. The shelf 608 is supported between the lid 407 and valve housing 424. Note that in the preferred embodiment illustrated, there is a gap 610 between the diaphragm 602 and the end portion 494 of the tube 486. The gap 610 allows for gas flow from the interior 603 of the valve housing 424 and into the gas flow aperture 490 of the tube 486. During operation, the spring 605 and the diaphragm 602 regulate flow into the tube 486.

The valve construction 496 also includes a bypass valve function. As the media in the filter element 420 becomes occluded and restriction increases to an unacceptably high level, pressures within the interior 603 of the valve housing 424 increase. This applies pressure against the diaphragm 602 and against the spring 604, until the gas is allowed to flow into an interior volume 612 defined by the lid 407. The gas then flows through the gas flow bypass outlet port 414 (FIG. 10).

Example Operation and Service

In operation, the depicted filter arrangement 400 works as follows. Blow-by gases from an engine crankcase are taken in through the gas flow inlet port 408. The gases pass into the interior 603 of the valve housing 424. The valve assembly 496 permits passage of the gas and into the gas flow aperture 490. From there, the gas passes through the first stage coalescer filter 416.

The gas flow passes through the upstream face 452, through the fibrous media 456, and out through the downstream face 454. The fibrous media 456 separates liquids, with any entrained solids, from the rest of the gas stream. The liquid flows out of the media 456 and, in the depicted embodiment, either drips directly into the liquid flow outlet port 412, or drains along the wall 514 of the flow construction arrangement 510. After passing through the liquid flow outlet port 412, the liquid, which is often oil, may be directed back into the crankcase for reuse.

The gas stream that is not coalesced by the first stage coalescer filter 416 flows through the fluid passage 516, through the exit aperture 520, around the end 521 of the wall 514 (making about a 180° turn) and into the gas flow plenum 522. From the gas flow plenum 522, the gas flows through the second stage filter media 418, which removes additional particles and solids from the gas stream. The gas flow is prevented from bypassing the second stage media 418 due to the radial seal 484 and axial seals 530, 476. The cleaned gas then flows downstream from the second stage filter media 418 out through the gas flow outlet port 410. From there, the gases may be directed to the turbo of the engine.

The filter arrangement 400 is serviced as follows. The cover member 406 is removed from the body assembly 404 by disengaging the latches 433. When the cover member 406 is removed from the body assembly 404, the axial seal 530 is released. The filter element 420 is exposed, projecting out of the body 405. The filter element 420 can then be grasped and pulled from the body 405. This releases the radial seal 484. Removing the filter element 420, of course, removes both the first stage coalescer filter 416 and the second stage media construction 418. The entire filter element 420 may be disposed. In many embodiments, the filter element 420 is constructed of at least 99% non-metallic materials, such that the filter element 420 is incineratable.

A second, new filter element 420 may than be installed. The new filter element 420 is installed within the housing 402 by putting the element 420 through the opening exposed by the removed cover member 406. The aperture 468 of the end cap 444 is oriented around the inlet tube 486, and slid laterally relative to the body 405 until the radial seal 484 is in place. Often, this is also when the projection 474 axially abuts the body interior 405 and forms an axial seal 476.

The cover 406 is than oriented over the exposed end of the filter element 420. The latches 433 are engaged, to operably secure the cover member 406 to the body 405. This also axially compresses the cover 406 against the element 420, and the axial seal 530 is formed.

IV. The Embodiment of FIGS. 16–21

An alternative embodiment of a preformed insert is shown in FIGS. 16–20, generally at 650. The insert 650 is usable in the filter element 420 in place of the insert 446. The insert 650 lends itself to convenient manufacturing techniques and may be preferred, in certain applications.

In general, the insert 650 preferably includes a frame construction 652; a flow construction arrangement 654; and a support ring or frame 656. These parts function analogously to the frame construction 450, flow construction arrangement 510, and support frame 574 described in connection with FIG. 15.

Preferably, the flow construction arrangement 654 includes a tube 660 formed by uninterrupted wall 662 surrounding and defining an open, fluid passage 664. The wall 662 includes a wall section 663 that is impervious. In the depicted embodiment, the entire wall 662 includes impervious wall section 663. In other embodiments, the wall 662 may include sections that are permeable to fluid. The wall 662 has an interior surface 666, which permits coalesced liquid to slide and drip to a liquid outlet port. The wall 662 defines an exit aperture 668, at an end 670 of the tube 660. In many applications, the exit aperture 668 allows both gas and liquid to exit therethrough. For example, in preferred applications, the exit aperture 668 allows the collected liquid to exit the tube 660 and flow into an appropriate liquid outlet port.

As with the embodiment of FIGS. 12 and 15, the wall 662, in preferred arrangements is a conical section 667, being sloped or tapered from inlet end 663 of the wall 662 to exit end 670. That is, in preferred embodiments, when the tube 660 has a circular cross-section, the diameter at the inlet end 663 is larger than the diameter at the outlet end 670. In many arrangements, the diameter at the inlet end 663 will be on the order of at least 0.5%, no greater than 25%, and typically 1–10% larger than the diameter at the end 670.

Figure 16:
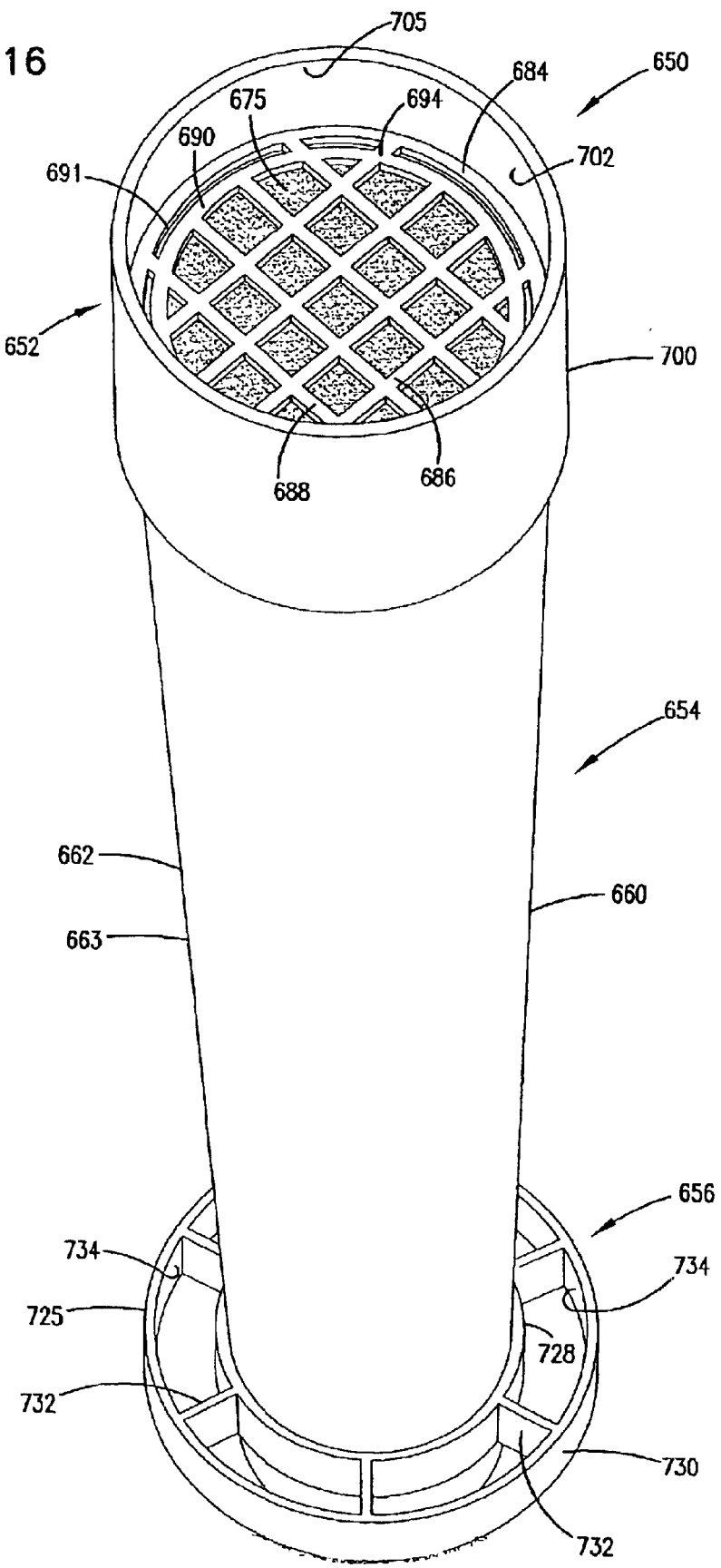
FIG. 16 is a perspective view of an alternative embodiment of a pre-formed insert that may be utilized within the filter element depicted in FIGS. 13–15.
Figure 19:
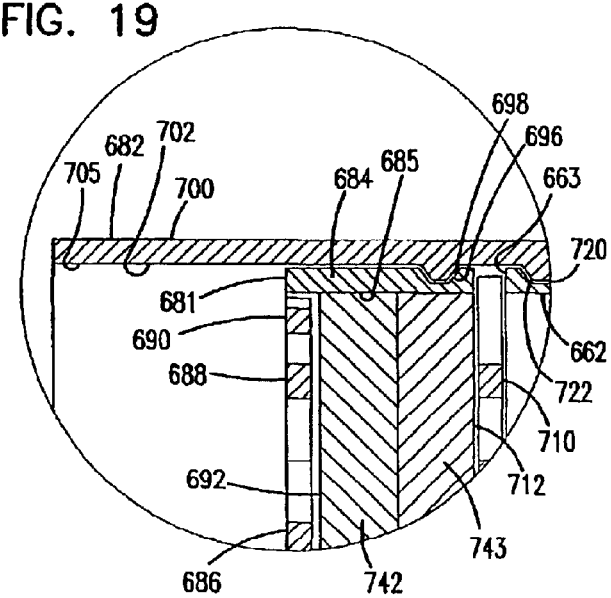
FIG. 19 is an enlarged, cross-sectional view of a portion of the pre-formed insert shown in FIG. 18.
Figure 18:
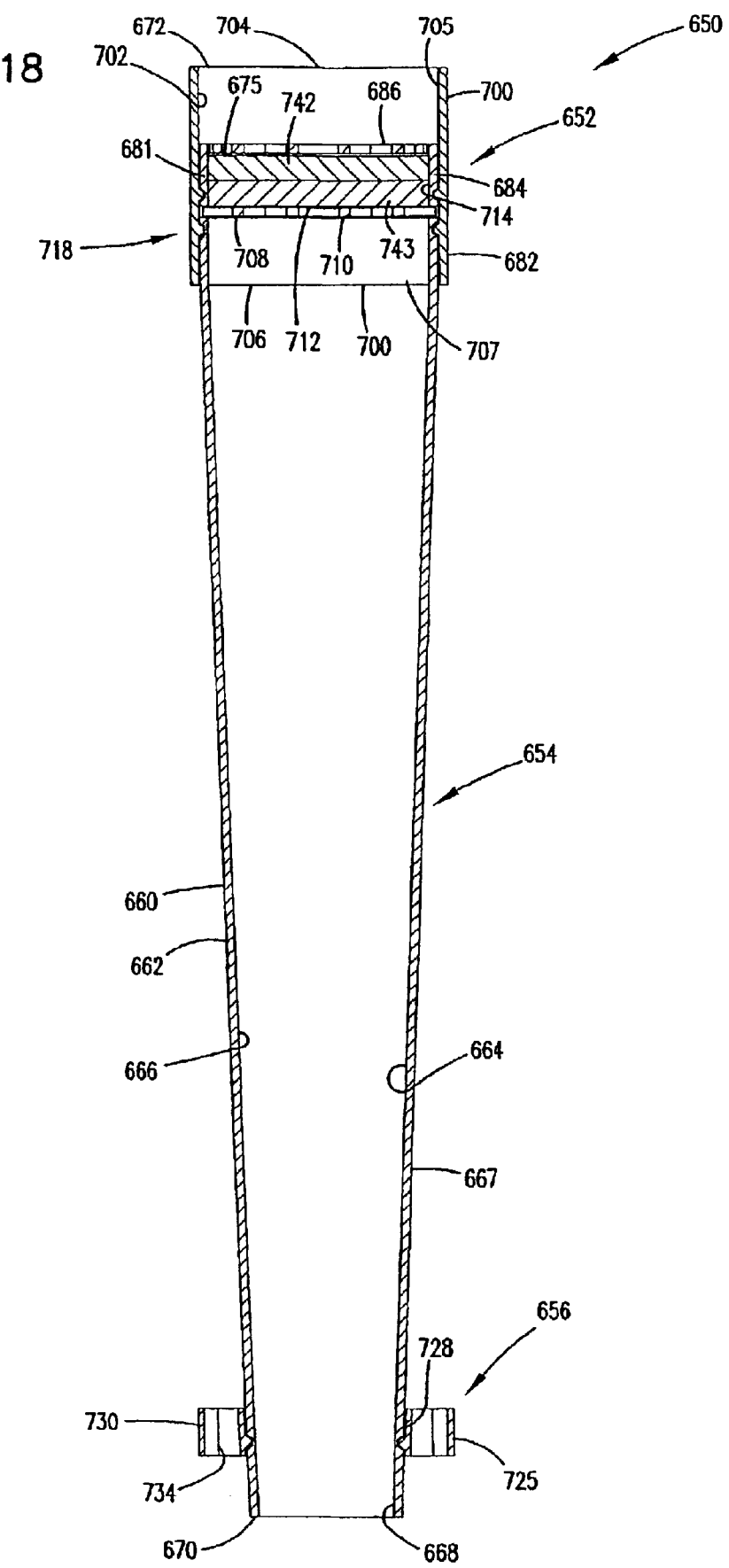
FIG. 18 is a cross-sectional view of the pre-formed insert depicted in FIGS. 16 and 17, the cross section being taken along the line 18—18 of FIG. 17.

Still in reference to FIGS. 16 and 18, the frame construction 652 preferably is provided for holding and encapsulating coalescing media 675. The frame construction 652 in this embodiment, is different from the frame construction 450 described above. In this particular embodiment, there is a first frame piece 681 and a second frame piece 682. The first frame piece has a wall or an outer annular rim 684 defining an inner volume 685 (FIG. 19). Axially spanning across one end of the rim 681 and integral with the wall 684 is a support grid 686, preferably in the form of a porous, mesh screen 688. The screen 688 provides structural support to the media 675 and permits gas flow to reach the media 675.

Figure 17:
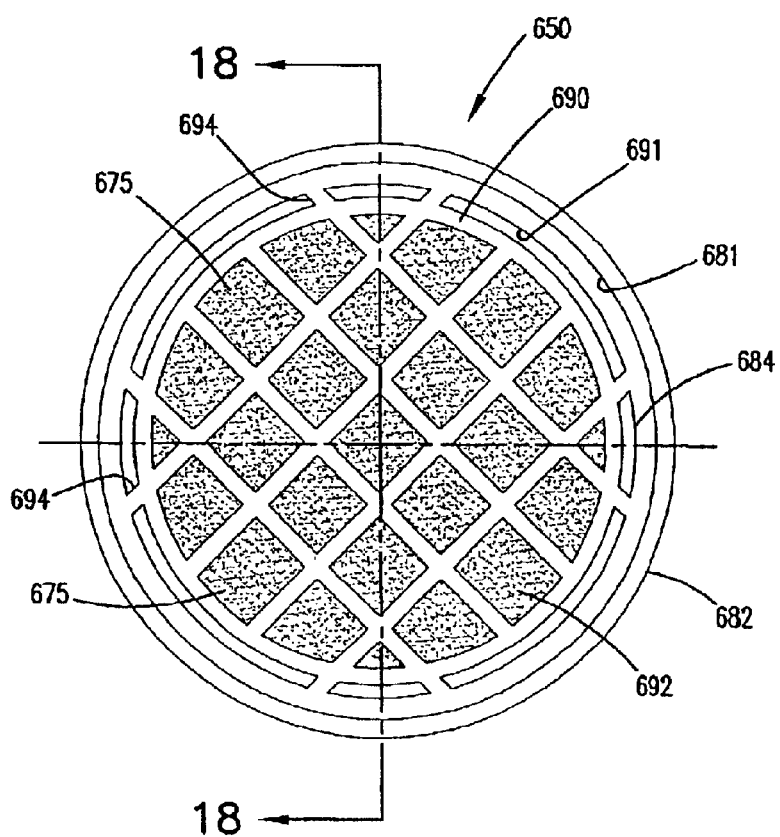
FIG. 17 is an end view of the pre-formed insert depicted in FIG. 16.

The first frame piece 681 also includes an inner rim 690, spaced adjacent to the outer rim 684. The inner rim 690 helps to prevent the flow of polyurethane end cap material from blocking the upstream face 692 of the media 675. (Example preferred molding techniques, and the function of the rim 690, are described further below.) As can be seen in FIGS. 16 and 17, the inner rim 690 is connected to the outer rim 684 with a plurality of ribs 694. The rim 690 is spaced preferably no greater than 5 millimeters from the outer rim 684 to form end cap material (e.g. polyurethane) flow passages 691 therebetween.

The wall or rim 684 preferably defines a recess 696 (FIG. 19) for engaging and receiving a mating detent 698. The detent 698 is part of the second frame piece 682, in the particular preferred embodiment illustrated. The detent 698, recess 696 provides for convenient, quick assembly and permits the first and second frame pieces 681, 682 to be snapped together. Of course, many other embodiments of mechanical engagement between the first and second frame pieces 681, 682 are contemplated.

The second frame piece 682 preferably includes an annular wall 700 surrounding and defining an open volume 702. In the particular embodiment illustrated, the wall 700 has a generally circular cross-section, which may be constant (to form a cylinder) or somewhat tapered to conform to the optional taper of the wall 662. The second frame piece wall 700 includes first and second opposite ends, 704, 706. In the embodiment illustrated, the end 704 generally corresponds to an inlet end 672.

Second frame piece 662 also preferably includes a support grid 708 spanning the open volume 702 and integral with the wall 700. Preferably, the grid 708 comprises a screen 710. The screen 710 provides structural support to the coalescing media 675 and preferably engages and holds the downstream face 712 of the media 675.

The first and second frame pieces 681, 682 form an interior volume or retaining pocket 714 to hold, entrap, and encapsulate the coalescing media 675. Preferably, the media 675 is mechanically compressed within the pocket 714, such that the grid 686 engages the upstream face 692 and the grid 708 engages the downstream face 712. As described above, the wall 700 includes a plurality of projections or detents 678 extending or projecting internally into the volume 702 to engage or snap into the recess 696.

The second frame piece 682 also includes mechanical engagement structure to securably attach to the wall 662 of the tube 660. In particular, the second frame piece and the tube 660 also includes mechanical engagement structure, such as a detent/recess engagement 718. In the particular way shown in FIG. 19, the wall 700 includes a second plurality of projections 720 extending or projecting into the interior volume 702, while the wall 662 has a recess 722 sized to receive the detents or projections 720. In this manner, the second frame piece 682 easily snaps and interlocks with the tube 660.

Still in reference to FIGS. 16 and 18, preferred frame constructions 652 also include support ring or frame 656. The support frame 656 is analogous to the support frame 574, described above. As such, the support frame 656 helps to center the frame construction 652 and hold it evenly within an open filter interior. The support frame 656, in the one depicted, includes a ring construction 725 having at least an inner ring (728) and an outer ring 730. The inner ring 728 and the outer ring 730 are preferably joined by a plurality of spokes or ribs 732. Between the inner rings 728 and outer ring 730, the ring construction 725 defines a plurality of gas flow passageways 734.

Figure 20:
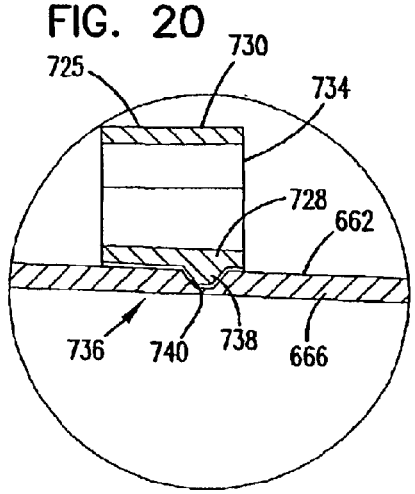
FIG. 20 is an enlarged, cross-sectional view of another portion of the pre-formed insert depicted in FIG. 18.

Attention is directed to FIG. 20. The ring construction 725 and the tube 660 are constructed and arranged to permit convenient manufacturing and assembly. In particular, the ring construction 725 and the tube 660 are configured to be secured together, such as by a mechanical engagement arrangement 736. The mechanical engagement arrangement 736 is analogous to those detent/recess arrangements described above. In particular, the inner ring 728 includes a plurality of projections or detents 738 extending radially internally of the ring 728. The wall 662 defines a recess 740 to accommodate the projections 738. In this manner, the support frame 656 can conveniently and mechanically engage or snap into place with structural integrity with the wall 662 of the tube 660.

The preformed insert 660 may be assembled as follows. The tube 660, the ring construction 725, and the first and second frame pieces 681, 682 are provided, preferably through injection molding techniques. The media 675 is provided and preferably includes more than one layer; as shown in FIG. 18, the media 675 is two layers 742, 743 of depth media.

The second frame piece 682 is oriented with respect to the tube 660, such that the opening 707 defined by the wall 700 at the second end 706 is placed over an open end 663 of (FIG. 19) of the wall 662 of the tube 660. The second frame piece 682 and the tube 660 are mechanically secured together through, for example, the mechanical engagement 718 of the projection 720 and recess 722. The two layers 742, 743 of media 675 are oriented over the screen 710 of the second frame piece 682. After the depth media 675 is placed within the volume or pocket 714, the first frame piece 681 is secured in position. In particular, the outer rim 684 is radially aligned with and inserted through the open end 705 defined by the wall 700 at the first end 704. The first frame piece 681 moves with respect to the second frame piece 682 along the interior of the wall 700, until the first and second frame pieces 681, 682 are secured together in mechanical engagement through the detent 698 and recess 696 arrangement.

It should be noted that the first and second frame pieces 681, 682 can be secured together with the fibrous bundle of media 675 trapped therebetween before the second frame piece 682 is secured to the tube 660.

The ring construction 725 is secured to the tube 660 by sliding the end 670 of the tube through the interior of the inner ring 728 and snapping the pieces together through the mechanical engagement arrangement 736. Of course, the ring 725 and the tube 660 may be secured together at any point during the assembly process.

In preferred arrangements, the assembled pre-formed insert 650 may then be secured to the remaining portions of the filter element 420 through, for example, molding techniques that are described further below.

Figure 21:
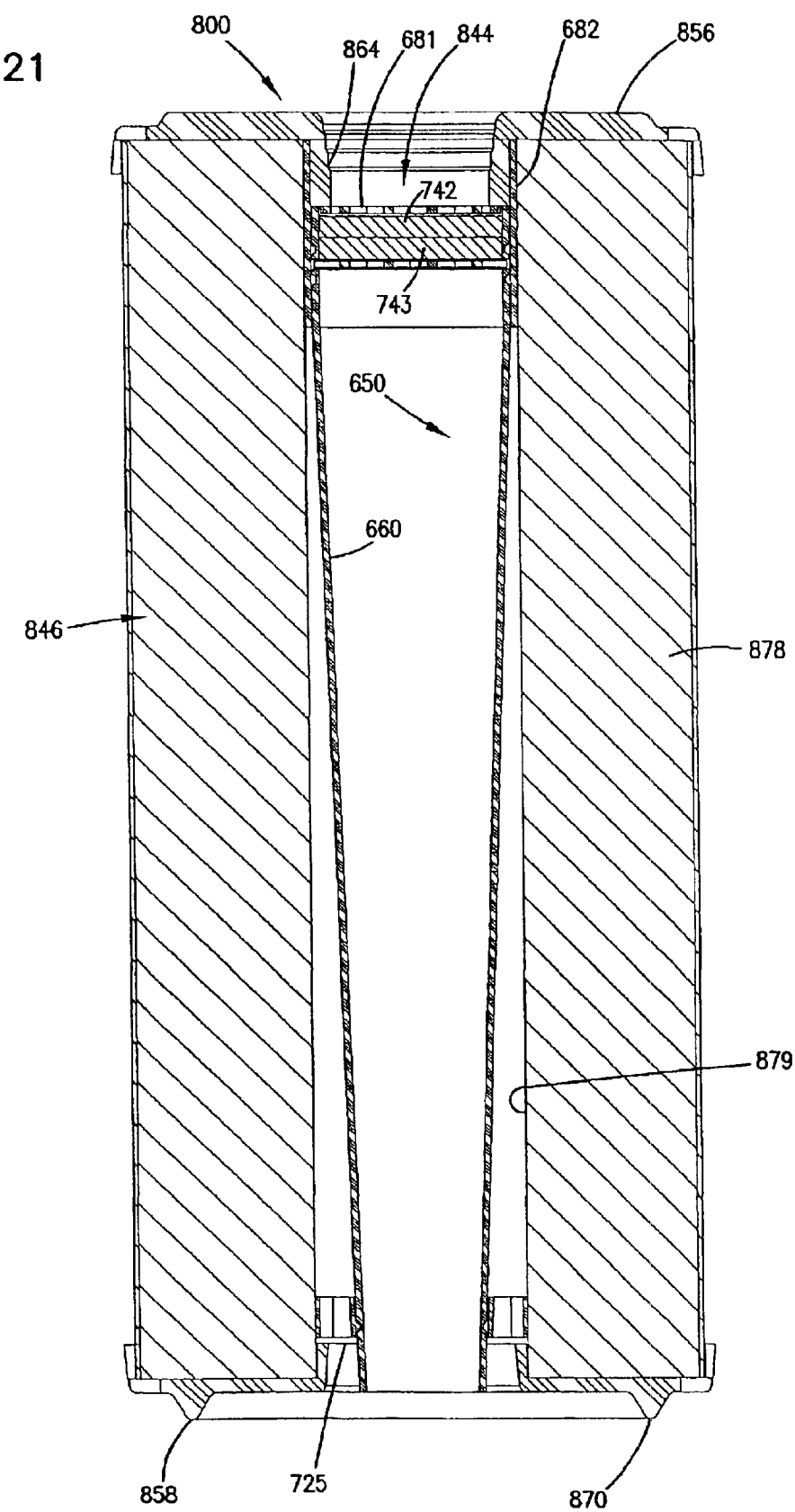
FIG. 21 is a cross-sectional view of another embodiment of a filter element constructed according to principles of this disclosure, and utilizing the pre-formed insert of FIGS. 16–20.

In FIG. 21, a filter element 800 is shown in cross-section with the insert 650 installed therein. It should be understood that, other than the insert 650, the filter element 800 is preferably constructed identically to the filter element 420. As such, the element 800 includes the first stage coalescer filter media 844, the second stage filter media construction 846, a first end cap 856, and an opposite, second end cap 858. Because the element 800 includes the insert construction 650, it includes tube 660, media 675, first frame piece 681, second frame piece 682, ring construction 725, and two layers of depth media 742, 743, each as described above.

Also as described above with respect to the filter element 420, the end cap 856 includes an inner, annular sealing portion 864, which forms a seal, preferably a radial seal with portions of an inlet tube. The end cap 858 is also configured analogously to the end cap 445 of FIG. 15, including a projection 870, which forms a seal, preferably an axial seal with a service cover. The second stage media construction 846 preferably includes pleated media 878 extending between the end caps 856, 858. The pleated media 878 defines an open tubular interior 879.

V. Molding Techniques

Figure 22:
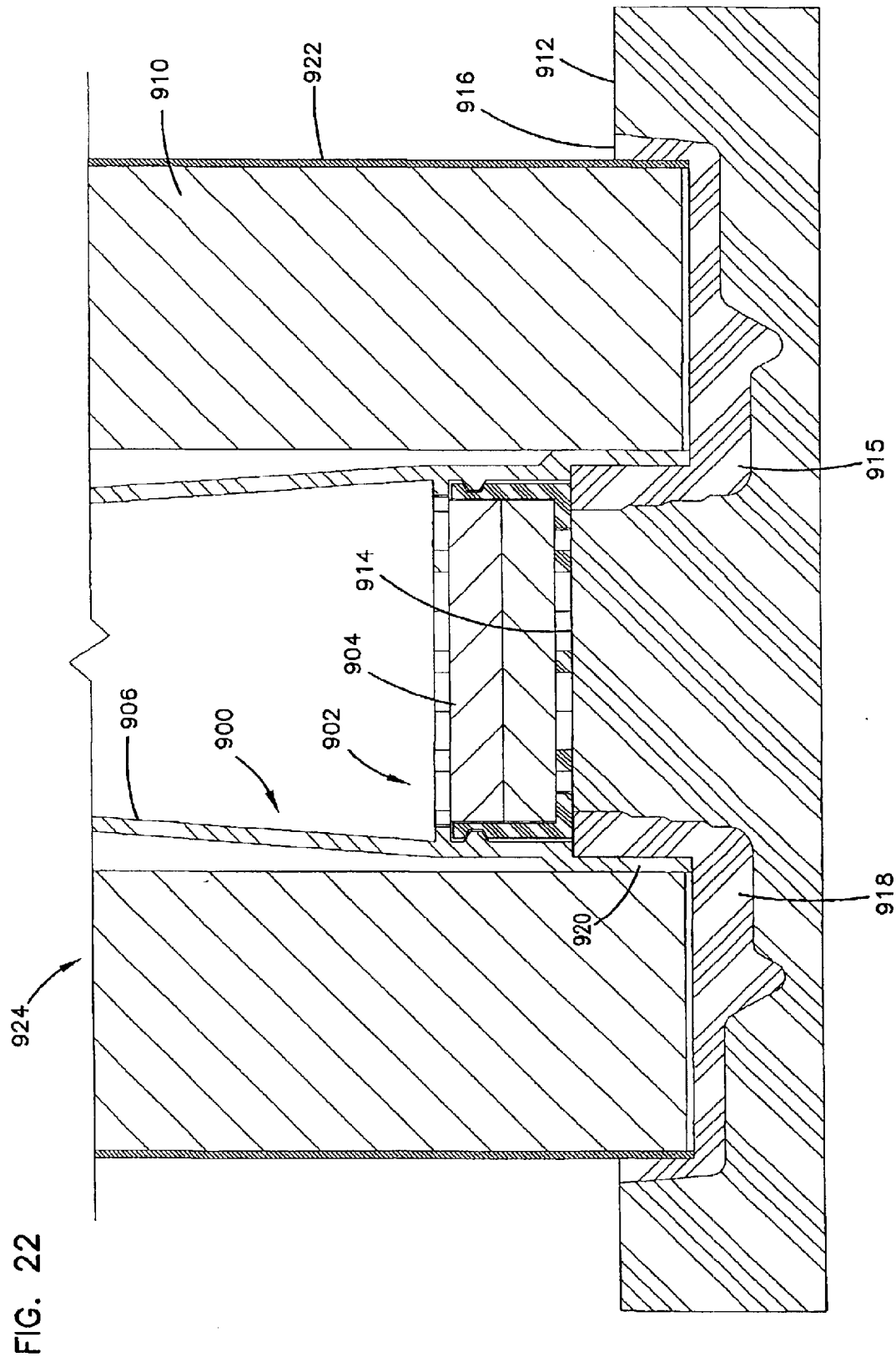
FIG. 22 is a schematic, cross-sectional view of one embodiment of a molding technique for constructing filter elements according to this disclosure.
Figure 23:
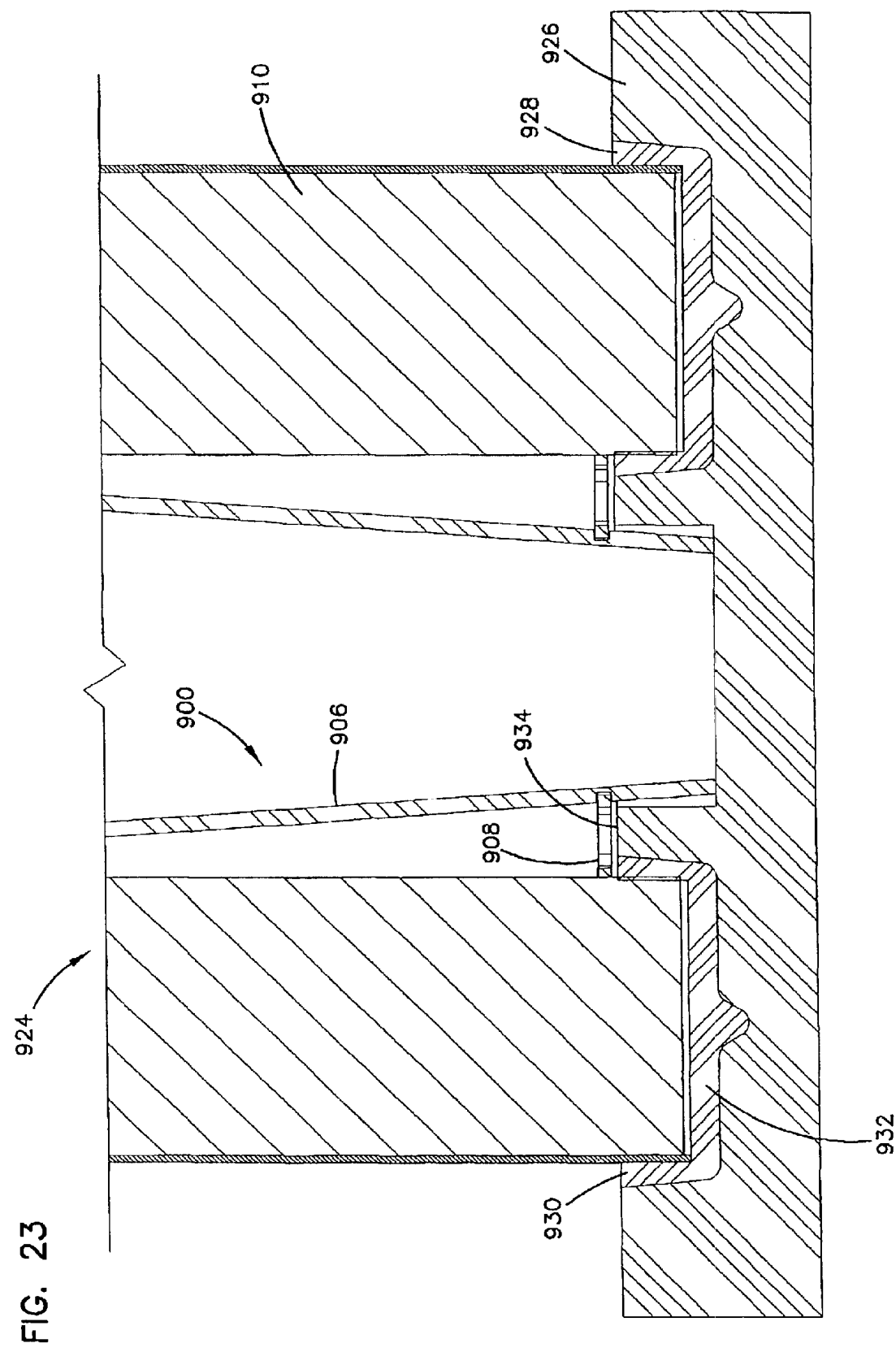
FIG. 23 is a schematic, cross-sectional view of one embodiment of a molding technique for constructing filter elements according to this disclosure.

Attention is now directed to FIGS. 22 and 23, which depict an example molding technique that is usable to manufacture filter elements described herein. In many preferred arrangements, the insert construction (such as preformed insert 446 and preformed insert 650) is assembled in advance, according to techniques described above. The preformed insert depicted in FIGS. 22 and 23 is shown generally at 900. The preformed insert 900 includes a frame construction 902 for holding coalescer media 904. The preformed insert 900 also includes a tube or tapered wall 906 and a ring construction 908.

Pleated media 910 is provided and formed in a ring or cylinder, around the preformed insert 900. The pleated media 910 with the insert 900 is oriented over a mold 912. Note that the mold 912 includes a platform or mount 914. The frame construction 902 rests upon the mount 914. Molten material for forming the end cap, such as polyurethane foam, is poured into the mold 912 in the volume 916. The molten end cap material 915 is formed in the negative shape of the mold 912. The end cap material 915 preferably rises as it cures and is allowed to penetrate the region 691 between, for example, the rim 690 and the outer rim 684 in the arrangement depicted in FIG. 17. This permits the end cap material 915 to secure the coalescer media 904 to the resulting end cap 918. The pleats of the pleated media 910 are also then secured to the resulting end cap 918 by being potted or molded into the end cap material 915. As can also be seen in FIG. 22, the backstop 920 of the frame construction 902 also becomes molded within the end cap 918. If desired, an outer liner 922 is placed around the outer perimeter of the pleats 910 and is molded with the end cap material 915.

After the end cap 918 is formed, the assembly 924 is inverted and placed into a mold 926. End cap material 928, such as polyurethane foam, rests in the volume 930. As the end cap material 928 cures, the pleats in the pleated media 910 are molded and fixed in place in the end cap material 928 to end up being potted within a resulting end cap 932. Note that the ring construction 908 is oriented in a position spaced from the mold 926 and with a mold plug 934 adjacent thereto, such that the ring construction 908 does not become blocked with end cap material 928.

VI. Principles Related to Size, Efficiency, and Performance; Materials

An arrangement utilizing principles described herein can be configured in a relatively small package, with efficient operation. For example, the first stage coalescer filter 416/844 is configured to have an upstream surface area of no more than 25%, usually no more than 10% of the upstream surface area of the second stage filter media 418/846. In many applications, this percentage is much lower, typically 2% or less and often 1% or less. Typical percentages of the upstream surface area of the first stage coalescer filter 416/844 to the second stage filter media 418/846 are in the range of at least 0.1%, typically 0.2%–1%. For heavy duty engines (engines having a 12–15 liter piston displacement), the percentage is on the order of less than 0.5%, typically 0.25%. For medium duty engines (engines having a 6–9 liter piston displacement), the ratio is often less than 0.8%, for example about 0.4%. For light duty engines (engines having a piston displacement of less than 6 liters), the ratio is usually less than 1.5%, for example on the order of 0.8%.

It is foreseen that systems such as those depicted in the figures will be configured in relatively small overall packages. For example, overall sizes for the element 420/800 will have an outside diameter of no greater than 8 inches, and at least 3 inches, with a length of no greater than 15 inches, and at least 4 inches. For heavy duty engines, the size of the element 420/800 will be about 5.5 inches diameter and 11 inches long. For medium duty engines, the element 420/800 will be about 5 inches in diameter and 8 inches long. For light duty engines, the size of the element 420/800 will be about 4 inches in diameter and 6 inches long.

When selecting the size for the element 420/800, the amount of filter media used in the element 420/800 is adjusted in order to maintain a desirable range of air velocities through the engine. In systems described herein, it is preferred that the face velocity across the first stage filter media 418/844 be maintained at a constant of 250–400 feet per minute. Similarly, it is preferable in systems described herein to maintain the face velocity across the second stage filter media 418/846 of no more than 1 foot per minute.

The amount of media for each of the first stage coalescer filter 416/844 and second stage filter media 418/846 are selected up to achieve efficient filtering, while limiting the amount of restriction. In systems described herein, the overall efficiency of the filter arrangement 400 is on the order of at least 80%, and typically 90–95%. By "efficiency", it is meant the fraction of mass in the gas stream that is captured or trapped by the first stage coalescer filter 416/844 and second stage filter media 418/846. The efficiency of the first stage coalescer filter 416/844 is usually at least 25%, in some cases no greater than 70%, typically 30–60%, for example 50%. The second stage filter media 418/846 preferably has a greater efficiency than the first stage coalescer media 416, on the order of at least 70%, typically 80–90%.

Restrictions across the first stage coalescer filter 416/844 are on the order of 0.5 inch of water at the beginning of the filter life, typically 3–4 inches, and on the order of 5.0 inches of water at the end of the filter life. For the second stage filter media 418/846, the restriction will be at least 0.5 inch of water (typically at the beginning of the filter life), and up to about 15 inches of water at the end of the life.

Usable Materials

The sealing portions 480, 864, and preferably, the entire end caps 444, 856 preferably comprise foamed polyurethane. One example foamed polyurethane is described above. Another usable foamed polyurethane is as follows: BASF 36361R resin/WUC 3259T isocyanate, with processing conditions of: component temperatures of 75–95° F. for the resin and for the isocyanate. The mold temperature should be 120–140° F. The demold time should be 6 minutes. The compression deflection at 70° F., average 10+4/−3 psi; after heat aging 7 days at 158° F., +/−20% change from original deflection; at −40° F. cold temperature, 100 psi maximum average. The compression set, after heat aging 22 hours at 212° F., 15% maximum. The hardness should be 26 Shore A. The tensile strength should be 92 psi target. The elongation should be 120% minimum average. The tear strength should be 10 lb/in minimum average. The as molded density should be less than 30 lbs/ft$^3$, for example, 23–28 lbs/ft$^3$, and can be in the range of 10–24 lbs/ft$^3$.

The housing 402 preferably comprises plastic, such as carbon filled nylon. The preformed inserts 650/446 are preferably injection molded from a synthetic resinous plastic material, such as DELRIN®, available from DuPont.

The media for the coalescer filter 456/884 preferably comprises polyester, depth media, as characterized above for media 224. The media 438/478 for the downstream construction preferably comprises pleated media, as characterized above for media 194.

In general, and in summary, the disclosure concerns an arrangement for use in separating a hydrophobic liquid aerosol phase, from a gas stream, during filtration of engine crankcase gases; the arrangement comprising: a first stage coalescer filter defining a flow passageway and including a nonwoven fibrous bundle extending across the flow passageway and having a first upstream surface area; and a second stage filter comprising pleated media positioned downstream from the nonwoven media of fibers of the first stage coalescer; the pleated media of the second stage filter having a second upstream surface area; the first upstream surface area being no more than 10% of the second upstream surface area; the arrangement characterized in that: the arrangement includes a first end cap (202, 272, 322, 444, 856) and a second end cap (254, 274, 324, 445, 858); the first end cap (202, 272, 322, 444, 856) including a central gas stream inlet aperture (206, 272a, 322a, 468, 864); the second stage filter (66, 278, 328, 418, 846) comprises a tubular construction of pleated media (194, 278, 328, 434, 878) extending between the first end cap (202, 272, 322, 444, 856) and the second end cap (254, 274, 324, 445, 858); the tubular construction of media (194, 278, 328, 434, 878) defining an open tubular interior (192, 296, 333, 436, 879); the central gas stream inlet aperture (206, 272a, 322a, 468, 864) of the first end cap (202, 272, 322, 444, 856) being in flow communication with the open tubular interior (192, 296, 333, 436, 879); the first stage coalescer filter (234, 298, 334, 416, 844) is oriented in extension across the gas stream inlet aperture (206, 272a, 322a, 468, 864); and the pleated media (194, 278, 328, 434, 878) of the second stage filter (66, 278, 328, 418, 846), the first end cap (202, 272, 322, 444, 856), the second end cap (254, 274, 324, 445, 858), and the first stage coalescer filter (234, 298, 334, 416, 844) are unitary in construction.

In some embodiments, the first upstream surface area is no more than 2% of the second upstream surface area. In some embodiments, the first upstream surface area is no more than 1% of the second upstream surface area. In general, the pleated media (278, 434, 878) has a length extending between the first end cap (272, 444, 856) and the second end cap (274, 445, 858); and the arrangement further includes: a tube (286, 512, 660) within the open tubular interior (192, 296, 436) oriented to direct fluid from the first stage coalescer filter (298, 416, 844); the tube including an imperforate section (287, 513, 663) extending a distance from the first end cap (272, 444, 856) of 33–95% of the length of the pleated media (278, 434, 878).

A frame construction (222, 298, 450, 652) is secured to the first end cap; the frame construction including a first frame piece (230, 550, 681) and a second frame piece (232, 552, 682) fitted together to define a retaining pocket (242, 560, 714) therebetween; the nonwoven fibrous bundle of the first stage coalescer filter being oriented within the retaining pocket. The first frame piece (681) includes: a cylindrical wall (684) defining an open inner volume (685); and a porous grid (686) integral with the cylindrical wall (684) and extending across the inner volume (685) of the first frame piece; the second frame piece (682) includes: a tubular wall (700) defining an open inner volume (702); and a porous grid (708) integral with the tubular wall (700) extending across the open inner volume (702) of the second frame piece; the nonwoven fibrous bundle of the first stage coalescer filter being positioned between the first frame piece porous grid (686) and the second frame piece porous grid (708).

In some embodiments, the tube (512, 660) includes a conical section (515, 667); the conical section having a tapered wall (514, 662) with an angle of taper of at least 1°; the tapered wall (514, 662) including a first end (519, 663) adjacent to the first stage coalescer filter and an opposite second end (521, 670) adjacent to the second end cap (445, 858); the tapered wall (514, 662) defining a fluid passage (516, 664).

In some embodiments, there is a support ring (725) centering the frame construction (652) within the open tubular interior (436); the support ring (725) including: an inner ring (728) secured to the tapered wall (662) adjacent to the second end (670) of the tapered wall (662); an outer ring (730) radially spaced from the inner ring; and a plurality of spokes (732) between the inner ring and the outer ring; the inner ring, outer ring, and spokes defining a plurality of gas flow passageways (734) to allow for the flow of gas from the fluid passage (664) of the tapered wall (662), around the second end (670) of the tapered wall (662), through the gas flow passageways (734), and into the pleated media (878).

In some embodiments, the second frame piece (552, 682) includes an axial extension forming a ring (568); the first end cap (444, 856) has an inner annular surface (472, 864) comprising a polymeric material positioned to form a radial seal (484) with a housing construction, when the filter arrangement is operably positioned in a housing construction; the axial extension of the second frame piece (552, 682) forming a ring (568) comprising a backstop (572, 682) to the radial seal (484), when the filter arrangement is operably positioned in a housing construction.

In some embodiments, the inner annular surface (472, 864) comprises a stepped construction 498 having a plurality of regions (501, 502, 503) of decreasing diameters. The second end cap (445, 858) has an outer, axial projection (474, 870) oriented to form an axial seal (476, 530) with a housing construction, when the filter arrangement is operably positioned in a housing construction. The second end cap (445, 858) includes a central aperture (255, 290, 507) in fluid communication with the second end (521, 670) of the tapered wall (514, 662).

In general, there is an insert construction (650) secured to the first end cap (856); the insert construction (650) including: a coalescer frame construction (652), a flow construction (654), and a support ring (656); the coalescer frame construction (652) and the support ring (656) being secured to the flow construction (654); the coalescer frame construction including a first frame piece (681) and a second frame piece (682); the first frame piece (681) including: a cylindrical wall (684) defining an open inner volume (685); a support grid (686) integral with the cylindrical wall (684) and extending across the inner volume (685) of the first frame piece (681); and an inner rim (690) spaced radially inwardly of and adjacent to the cylindrical wall (684); the inner rim (690) and the cylindrical wall (684) defining material flow passages (691) therebetween; the second frame piece (682) including: a tubular wall (700) defining an open inner volume (702); a support grid (708) integral with the tubular wall (700) extending across the open inner volume (702) of the second frame piece; and an axial extension forming a ring (568); the nonwoven fibrous bundle of the first stage coalescer filter being positioned between the first frame piece support grid (686) and the second frame piece support grid (708); the first end cap (856) having an inner annular sealing surface (864) comprising a polymeric material; the ring (568) of the second frame piece (682) comprising a backstop (572, 682) to the inner annular sealing surface (864), when the filter arrangement is operably positioned in a housing construction; the flow construction (654) includes a tube (660) within the open tubular interior (879); the tube (660) including a tapered wall (662) including a first end (663) adjacent to the first stage coalescer filter (844) and an opposite second end (670) adjacent to the second end cap (858); the tapered wall (662) defining a fluid passage (664) therewithin; the tapered wall (662) having an angle of taper of at least 1°; and the support ring (725) centering the frame construction (652) within the open tubular interior (879); the support ring (725) including: an inner ring (728) secured to the tapered wall (662) adjacent to the second end (670) of the tapered wall (662); an outer ring (730) radially spaced from the inner ring; a plurality of spokes (732) between the inner ring and the outer ring; the inner ring (728), outer ring (730), and spokes (732) defining a plurality of gas flow passageways (734) therebetween to allow for the flow of gas from the fluid passage (664) of the tapered wall (662), around the second end (670) of the tapered wall (662), through the gas flow passageways (734), and into the pleated media (878).

In some embodiments, the first frame piece (681) and a second frame piece (682) are secured together by a detent and recess interlock (696, 698); the second frame piece (682) and the tapered wall (662) are secured together by a detent and recess interlock (720, 722); and the inner ring (728) is secured to the tapered wall (662) by a detent and recess interlock (738, 740).

Preferably, there is a housing (52, 402) defining an interior and having a gas flow inlet (58, 405), a gas flow outlet (60, 410), and a liquid flow outlet (62, 412); the pleated media (194, 344, 434, 878), the first end cap (202, 272, 322, 444, 856), the second end cap (254, 274, 324, 445, 858), and the first stage coalescer filter (234, 298, 334, 416, 844) forming a filter element operably oriented within the housing interior; the first end cap (444, 856) having an annular surface (210, 472, 864) comprising a polymeric material form a radial seal (214, 484) with the housing (52, 402).

Preferably, the arrangement is used as part of a blow-by recovery system.

There is also provided a method of treating diesel engine blow-by gases; the method comprising steps of directing blow-by gases from a diesel engine to a coalescer filter; removing at least a portion of a liquid phase from the gases with the coalescer filter as a collected liquid; after said step of removing at least a portion of a liquid phase, directing the gases through a tubular media filter; filtering at least a portion of particulates from the gases with the tubular media filter, and after said step of removing at least a portion of the collected liquid phase, directing drainage of at least a portion of the collected liquid from the coalescer filter, along a flow construction arrangement in the interior of the tubular media filter, to an outlet.

In many embodiments, the step of directing drainage includes draining by gravity the collected liquid along a flow construction arrangement including an inner tube oriented within the interior of the tubular media filter. In many instances, the step of directing the gases through the tubular media filter includes directing the gases along the interior volume of the inner tube, around an end of the inner tube, and into a gas flow plenum between a volume outside of the inner tube and inside of the tubular media filter.

There is also provided a method of servicing a filter arrangement; the method comprising: removing a cover member from a body assembly; installing a filter element into the body assembly; the step of installing the filter element includes simultaneously installing a coalescer filter and a tubular media filter with a liquid flow construction arrangement; and securing the cover member to the body assembly.

In preferred methods, the step of installing includes forming a radial seal between the filter element and the body assembly. Also, in preferred methods, the step of installing includes installing a cylindrical extension of pleated media with a region of fibrous media oriented in a first end cap at one end of the extension of pleated media.

Other embodiments of the invention will be apparent to those skilled in the art from consideration of the specification and practice of the invention disclosed herein.

What is claimed is:

1. An arrangement for use in separating a hydrophobic liquid aerosol phase, from a gas stream, during filtration of engine crankcase gases; the arrangement comprising: a first stage coalescer filter defining a flow passageway and including a nonwoven fibrous bundle extending across the flow passageway and having a first upstream surface area; and a second stage filter comprising pleated media positioned downstream from the nonwoven media of fibers of the first stage coalescer; the pleated media of the second stage filter having a second upstream surface area; the first upstream surface area being no more than 10% of the second upstream surface area; the arrangement characterized in that:
(a) the arrangement includes a first end cap and a second end cap;
  (i) the first end cap including a central gas stream inlet aperture;
(b) the second stage filter comprises a tubular construction of pleated media extending between the first end cap and the second end cap;
  (i) the tubular construction of media defining an open tubular interior;

(ii) the central gas stream inlet aperture of the first end cap being in flow communication with the open tubular interior;

(c) the first stage coalescer filter is oriented in extension across the gas stream inlet aperture; and (d) the pleated media of the second stage filter, the first end cap, the second end cap, and the first stage coalescer filter are unitary in construction.

2. An arrangement according to claim 1 wherein:

(a) the first upstream surface area is no more than 2% of the second upstream surface area.

3. An arrangement according to claim 1 wherein:

(a) the first upstream surface area is no more than 1% of the second upstream surface area.

4. An arrangement according to claim 1 wherein:

(a) the pleated media has a length extending between the first end cap and the second end cap; and (b) the arrangement further includes:
  (i) a tube within the open tubular interior oriented to direct fluid from the first stage coalescer filter;
    (A) the tube including an imperforate section extending a distance from the first end cap of 33–95% of the length of the pleated media.

5. An arrangement according to claim 4 further including:

(a) a frame construction secured to the first end cap; the frame construction including a first frame piece and a second frame piece fitted together to define a retaining pocket therebetween;
  (i) the nonwoven fibrous bundle of the first stage coalescer filter being oriented within the retaining pocket.

6. An arrangement according to claim 5 wherein:

(a) the first frame piece includes: a cylindrical wall defining an open inner volume; and a porous grid integral with the cylindrical wall and extending across the inner volume of the first frame piece;

(b) the second frame piece includes: a tubular wall defining an open inner volume; and a porous grid integral with the tubular wall extending across the open inner volume of the second frame piece;
  (i) the nonwoven fibrous bundle of the first stage coalescer filter being positioned between the first frame piece porous grid and the second frame piece porous grid.

7. An arrangement according to claim 6 wherein:

(a) the tube includes a conical section; the conical section having a tapered wall with an angle of taper of at least 1°;
  (i) the tapered wall including a first end adjacent to the first stage coalescer filter and an opposite second end adjacent to the second end cap; the tapered wall defining a fluid passage.

8. An arrangement according to claim 7 further including:

(a) a support ring centering the frame construction within the open tubular interior; the support ring including:
  (i) an inner ring secured to the tapered wall adjacent to the second end of the tapered wall;
  (ii) an outer ring radially spaced from the inner ring; and
  (iii) a plurality of spokes between the inner ring and the outer ring;
    (A) the inner ring, outer ring, and spokes defining a plurality of gas flow passageways to allow for the flow of gas from the fluid passage of the tapered wall, around the second end of the tapered wall, through the gas flow passageways, and into the pleated media.

9. An arrangement according to claim 6 wherein:

(a) the second frame piece includes an axial extension forming a ring;

(b) the first end cap has an inner annular surface comprising a polymeric material positioned to form a radial seal with a housing construction, when the filter arrangement is operably positioned in a housing construction;
  (i) the axial extension of the second frame piece forming a ring comprising a backstop to the radial seal, when the filter arrangement is operably positioned in a housing construction.

10. An arrangement according to claim 9 wherein:

(a) the inner annular surface comprises a stepped construction having a plurality of regions of decreasing diameters.

11. An arrangement according to claim 1 wherein:

(a) the second end cap has an outer, axial projection oriented to form an axial seal with a housing construction, when the filter arrangement is operably positioned in a housing construction.

12. An arrangement according to claim 7 wherein:

(a) the second end cap includes a central aperture in fluid communication with the second end of the tapered wall.

13. An arrangement according to claim 1 further including:

(a) an insert construction secured to the first end cap; the insert construction including: a coalescer frame construction, a flow construction, and a support ring; the coalescer frame construction and the support ring being secured to the flow construction;
  (i) the coalescer frame construction including a first frame piece and a second frame piece;
    (A) the first frame piece including: a cylindrical wall defining an open inner volume; a support grid integral with the cylindrical wall and extending across the inner volume of the first frame piece; and an inner rim spaced radially inwardly of and adjacent to the cylindrical wall; the inner rim and the cylindrical wall defining material flow passages therebetween;
    (B) the second frame piece including: a tubular wall defining an open inner volume; a support grid integral with the tubular wall extending across the open inner volume of the second frame piece; and an axial extension forming a ring;
    (C) the nonwoven fibrous bundle of the first stage coalescer filter being positioned between the first frame piece support grid and the second frame piece support grid;
    (D) the first end cap having an inner annular sealing surface comprising a polymeric material; the ring of the second frame piece comprising a backstop to the inner annular sealing surface, when the filter arrangement is operably positioned in a housing construction;
  (ii) the flow construction includes a tube within the open tubular interior;
    (A) the tube including a tapered wall including a first end adjacent to the first stage coalescer filter and an opposite second end adjacent to the second end cap; the tapered wall defining a fluid passage therewithin; the tapered wall having an angle of taper of at least 1°; and (iii) the support ring centering the frame construction within the open tubular interior; the support ring including:
  (A) an inner ring secured to the tapered wall adjacent to the second end of the tapered wall;
  (B) an outer ring radially spaced from the inner ring;
  (C) a plurality of spokes between the inner ring and the outer ring;
  (D) the inner ring, outer ring, and spokes defining a plurality of gas flow passageways therebetween to allow for the flow of gas from the fluid passage of the tapered wall, around the second end of the tapered wall, through the gas flow passageways, and into the pleated media.

14. An arrangement according to claim 13 wherein:
  (a) the first frame piece and a second frame piece are secured together by a detent and recess interlock;
  (b) the second frame piece and the tapered wall are secured together by a detent and recess interlock; and
  (c) the inner ring is secured to the tapered wall by a detent and recess interlock.

15. An arrangement according to claim 1 further including:
  (a) a housing defining an interior and having a gas flow inlet, a gas flow outlet, and a liquid flow outlet;
    (i) the pleated media, the first end cap, the second end cap, and the first stage coalescer filter forming a filter element operably oriented within the housing interior;
    (ii) the first end cap having an annular surface comprising a polymeric material forming a radial seal with the housing.

16. A method for separating a hydrophobic liquid aerosol phase, from a gas stream, during filtration of engine crankcase gases; the method comprising:
  (a) directing the gas stream in a gas stream inlet aperture in an arrangement; the arrangement including a first end cap and a second end cap;
    (i) the first end cap including the central gas stream inlet aperture;
  (b) separating a liquid aerosol phase from the gas stream by directing the gas stream through a first stage coalescer filter oriented in extension across the gas stream inlet aperture; and
  (c) after separating a liquid aerosol phase from the gas stream, directing the gas stream through a second stage filter comprising a tubular construction of pleated media extending between the first end cap and the second end cap;
    (i) the tubular construction of media defining an open tubular interior;
    (ii) the central gas stream inlet aperture of the first end cap being in flow communication with the open tubular interior; and
    (iii) the pleated media of the second stage filter, the first end cap, the second end cap, and the first stage coalescer filter being unitary in construction.

17. A method according to claim 16 wherein:
  (a) said step of separating a liquid aerosol phase from the gas stream by directing the gas stream through a first stage coalescer filter includes directing the gas stream through a first stage coalescer filter having an upstream surface area not greater than 10% of the upstream surface area of the second stage filter.

18. A method according to claim 16 wherein:
  (a) said step of separating a liquid aerosol phase from the gas stream by directing the gas stream through a first stage coalescer filter includes directing the gas stream through a first stage coalescer filter having an upstream surface area not greater than 2% of the upstream surface area of the second stage filter.

19. A method according to claim 16 further comprising:
  (a) after said step of separating a liquid aerosol phase from the gas stream, draining the liquid aerosol phase through an aperture in one of the first and second end caps.

20. A method according to claim 19 wherein:
  (a) said step of draining the liquid aerosol phase includes draining the liquid aerosol phase through an aperture in the second end cap.

\* \* \* \* \*